US012289546B2

(12) United States Patent
Hamamatsu et al.

(10) Patent No.: US 12,289,546 B2
(45) Date of Patent: Apr. 29, 2025

(54) SOLID-STATE IMAGING ELEMENT AND ELECTRONIC DEVICE

(71) Applicant: SONY SEMICONDUCTOR SOLUTIONS CORPORATION, Kanagawa (JP)

(72) Inventors: Masamune Hamamatsu, Kanagawa (JP); Akihiko Miyanohara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 441 days.

(21) Appl. No.: 17/760,930

(22) PCT Filed: Jul. 13, 2020

(86) PCT No.: PCT/JP2020/027193
§ 371 (c)(1),
(2) Date: Mar. 16, 2022

(87) PCT Pub. No.: WO2021/059675
PCT Pub. Date: Apr. 1, 2021

(65) Prior Publication Data
US 2022/0345652 A1 Oct. 27, 2022

(30) Foreign Application Priority Data
Sep. 24, 2019 (JP) .................. 2019-172485

(51) Int. Cl.
H04N 25/705 (2023.01)
G01S 7/481 (2006.01)
(Continued)

(52) U.S. Cl.
CPC ......... H04N 25/705 (2023.01); G01S 7/4816 (2013.01); G01S 7/4865 (2013.01);
(Continued)

(58) Field of Classification Search
CPC .... H04N 25/705; G01S 7/4865; G01S 17/894
See application file for complete search history.

(56) References Cited

U.S. PATENT DOCUMENTS

2004/0200950 A1 10/2004 Beausoleil
2009/0237001 A1 9/2009 Inukai
(Continued)

FOREIGN PATENT DOCUMENTS

CN 102511025 A 6/2012
CN 105849583 A 8/2016
(Continued)

OTHER PUBLICATIONS

International Search Report and Written Opinion of PCT Application No. PCT/JP2020/027193, issued on Sep. 29, 2020, 08 pages of ISRWO.
(Continued)

Primary Examiner — Thanh Luu
(74) Attorney, Agent, or Firm — CHIP LAW GROUP

(57) ABSTRACT

In a solid-state imaging element that measures a distance, miniaturization of pixels is facilitated. The solid-state imaging element includes a pixel array unit and a photon number detection unit. In the solid-state imaging element including the pixel array unit and the photon number detection unit, the pixel array unit is provided with a plurality of pixels that generates a predetermined analog signal depending on incidence of a photon and a signal line to which the plurality of pixels is connected in common. Furthermore, in the solid-state imaging element, the photon number detection unit detects the number of photons incident, on the basis of the analog signal transmitted via the signal line.

13 Claims, 36 Drawing Sheets

(51) Int. Cl.
*G01S 7/4865* (2020.01)
*G01S 17/894* (2020.01)
*G09G 3/3233* (2016.01)
*G09G 3/3258* (2016.01)
*H04N 25/00* (2023.01)
*H04N 25/50* (2023.01)
*H04N 25/75* (2023.01)
*H04N 25/772* (2023.01)

(52) U.S. Cl.
CPC .......... *G01S 17/894* (2020.01); *G09G 3/3233* (2013.01); *G09G 3/3258* (2013.01); *H04N 25/00* (2023.01); *H04N 25/50* (2023.01); *H04N 25/75* (2023.01); *H04N 25/772* (2023.01)

(56) References Cited

U.S. PATENT DOCUMENTS

| | | |
|---|---|---|
| 2014/0103196 A1 | 4/2014 | Soga et al. |
| 2016/0019182 A1 | 1/2016 | Clements |
| 2016/0084703 A1* | 3/2016 | Shaber ................ G01T 1/20184 250/336.1 |
| 2016/0191829 A1* | 6/2016 | Guo ........................ G01T 1/208 348/301 |
| 2016/0231168 A1* | 8/2016 | Guo ........................ G01T 1/248 |
| 2018/0204860 A1 | 7/2018 | Kokubun |
| 2018/0338127 A1 | 11/2018 | Wang et al. |
| 2018/0364340 A1 | 12/2018 | Ichiyanagi |
| 2020/0217965 A1* | 7/2020 | Calder ................ G01S 7/4811 |

FOREIGN PATENT DOCUMENTS

| | | |
|---|---|---|
| CN | 108881752 A | 11/2018 |
| CN | 109196662 A | 1/2019 |
| CN | 110249624 A | 9/2019 |
| JP | 5380646 B1 | 1/2014 |
| JP | 2014-081253 A | 5/2014 |
| JP | 2016-176750 A | 10/2016 |
| JP | 2018-113397 A | 7/2018 |
| JP | 2019-002760 A | 1/2019 |

OTHER PUBLICATIONS

Yanhua Zhai et al.: "Photon-number-resolved detection of photon-subtracted thermallight", Optics Letters, Jul. 31, 2013, vol. 38, No. 13, 6 pgs.

Jia Xiaojing et al.: "Design and im plementation for the detection and transmission", Feb. 15, 2010, 4 pgs., Southeast University Information University, Zhengzhou.

* cited by examiner

SOLID-STATE IMAGING ELEMENT AND ELECTRONIC DEVICE

CROSS REFERENCE TO RELATED APPLICATIONS

This application is a U.S. National Phase of International Patent Application No. PCT/JP2020/027193 filed on Jul. 13, 2020, which claims priority benefit of Japanese Patent Application No. JP 2019-172485 filed in the Japan Patent Office on Sep. 24, 2019. Each of the above-referenced applications is hereby incorporated herein by reference in its entirety.

TECHNICAL FIELD

The present technology relates to a solid-state imaging element. Specifically, the present technology relates to a solid-state imaging element that counts the number of photons incident, and an electronic device.

BACKGROUND ART

In an electronic device having a distance measurement function, a distance measurement method called a time of flight (ToF) method is conventionally known. The ToF method is a method of measuring a distance by irradiating an object with irradiation light from a distance measurement device and obtaining a round-trip time until the irradiation light is reflected and returned. For example, a distance measurement device has been devised in which each of a plurality of pixels and an adder are connected to each other via a pulse waveform circuit and a signal line, histograms for respective pixels are synthesized by the adder, and a time to a peak of a synthesized histogram is converted into a distance (see, for example, Patent Document 1).

CITATION LIST

Patent Document

Patent Document 1: Japanese Patent Application Laid-Open No. 2016-176750

SUMMARY OF THE INVENTION

Problems to be Solved by the Invention

In the above-described conventional technology, a signal to noise (S/N) ratio can be improved by synthesizing the histograms for the respective pixels as compared with a case where the histograms are not synthesized. However, since each of the pixels needs to be connected to the adder via the signal line, the number of wiring lines of the signal lines increases as the number of pixels increases due to miniaturization of pixels. When the number of wiring lines increases, the signal line needs to be thinned, and it becomes difficult to ensure a transmission band. Furthermore, due to an increase in the number of wiring lines, a degree of freedom in designing wiring decreases, and skew increases. As described above, there is a problem that miniaturization of pixels becomes difficult due to the increase in the number of wiring lines.

The present technology has been made in view of such a situation, and an object thereof is to facilitate miniaturization of pixels in a solid-state imaging element that measures a distance.

Solutions to Problems

The present technology has been made to solve the above-described problems, and a first aspect thereof is a solid-state imaging element including: a pixel array unit provided with a plurality of pixels that generates a predetermined analog signal depending on incidence of a photon and a signal line to which the plurality of pixels is connected in common; and a photon number detection unit that detects the number of photons incident, on the basis of the analog signal transmitted via the signal line. This brings about an effect that the number of wiring lines of the signal lines is reduced.

Furthermore, in the first aspect, each of the plurality of pixels may supply a current signal as the analog signal via the signal line, and the photon number detection unit may include: a current-voltage conversion unit that converts a current signal into a voltage signal; and an analog-digital conversion unit that converts the voltage signal into the number of photons. This brings about an effect that the number of photons is detected on the basis of the current signal.

Furthermore, in the first aspect, each of the plurality of pixels may include: a light receiving circuit that outputs a cathode potential that decreases when the photon is incident; a second pulse signal generation unit that generates a second pulse signal depending on the cathode potential; and a current source transistor that outputs, to the signal line, the current signal depending on the pulse signal. This brings about an effect that the current signal is transmitted corresponding to a drop in the cathode potential.

Furthermore, in the first aspect, each of the plurality of pixels may further includes: a first pulse signal generation unit that generates a first pulse signal having a pulse width shorter than a pulse width of the second pulse signal on the basis of an inverted signal obtained by inverting the cathode potential; and a mask processing unit that stops output of the current signal to the signal line over a predetermined mask period after the first pulse signal is generated, and the analog-digital conversion unit may convert the voltage signal into the number of photons within the mask period. This brings about an effect that the current signal is masked over the mask period after the pulse signal is generated depending on the inverted signal of the cathode potential.

Furthermore, in the first aspect, each of the plurality of pixels may transmit, as the current signal, a pair of differential signals obtained by differentially amplifying the pulse signal and a signal obtained by inverting the pulse signal. This brings about an effect that a decrease in a signal level due to an increase in wiring resistance is suppressed.

Furthermore, in the first aspect, the analog-digital conversion unit may include: a zero current confirmation circuit that confirms whether or not the current signal is output; a time digital converter that converts an elapsed time from a light emission timing to a drop of the cathode potential into a digital value in a case where the current signal is not output; and a simultaneous reaction number detection unit that detects the number of photons incident within the elapsed time on the basis of the digital value and the voltage signal. This brings about an effect that the number of simultaneous reactions is detected.

Furthermore, in the first aspect, the simultaneous reaction number detection unit may include: a peak hold circuit that holds a peak value of the voltage signal within the elapsed time; and a logic circuit that detects the number of photons on the basis of the peak value. This brings about an effect that the number of photons is detected from the peak value of the voltage signal.

Furthermore, in the first aspect, the simultaneous reaction number detection unit may include: a sample hold circuit that takes in the voltage signal at a predetermined timing within the elapsed time and holds the voltage signal as a hold value; and a logic circuit that detects the number of photons on the basis of the hold value. This brings about an effect that the number of photons is detected from the value obtained by sample hold.

Furthermore, in the first aspect, each of the plurality of pixels may supply a voltage signal as the analog signal via the signal line, and the photon number detection unit may include an analog-digital conversion unit that converts the voltage signal into the number of photons. This brings about an effect that the current-voltage conversion unit becomes unnecessary.

Furthermore, in the first aspect, the analog-digital conversion unit may detect the number of photons on the basis of a frequency characteristic of the voltage signal. This brings about an effect that the current-voltage conversion unit becomes unnecessary and the number of photons is detected on the basis of frequency characteristic.

Furthermore, in the first aspect, the analog-digital converter may detect the number of photons on the basis of a slew rate of the voltage signal. This brings about an effect that circuit scale is reduced.

Furthermore, in the first aspect, the pixel array unit may be divided into a plurality of pixel blocks, and the photon number detection unit may detect the number of photons for each of the plurality of pixel blocks. This brings about an effect that distance measurement data is generated for each pixel block.

Furthermore, a second aspect of the present technology is an electronic device including: a pixel array unit provided with a plurality of pixels that generates a predetermined analog signal depending on incidence of a photon and a signal line to which the plurality of pixels is connected in common; a photon number detection unit that detects the number of photons incident, on the basis of the analog signal transmitted via the signal line; and a signal processing unit that measures a distance to a predetermined object on the basis of the number of photons. This brings about an effect that the number of wiring lines of the signal lines is reduced in a device that performs distance measurement.

MODE FOR CARRYING OUT THE INVENTION

The following is a description of a mode for carrying out the present technology (the mode will be hereinafter referred to as the embodiment). The description will be made in the following order.

1. First embodiment (example of connecting a plurality of pixels in common to a signal line)
2. Second embodiment (example of connecting a plurality of pixels in common to a signal line and performing mask processing)
3. Third embodiment (example of connecting a plurality of pixels in common to a signal line and providing a sample hold circuit)
4. Fourth embodiment (example of connecting a plurality of pixels in common to a signal line and performing differential amplification)
5. Fifth embodiment (example of connecting a plurality of pixels in common to a signal line and transmitting a voltage signal)
6. Sixth embodiment (example of connecting a plurality of pixels in common to a signal line and obtaining a slew rate)
7. Application example to mobile body 1. First Embodiment

[Configuration Example of Distance Measurement Module]

Figure 1:
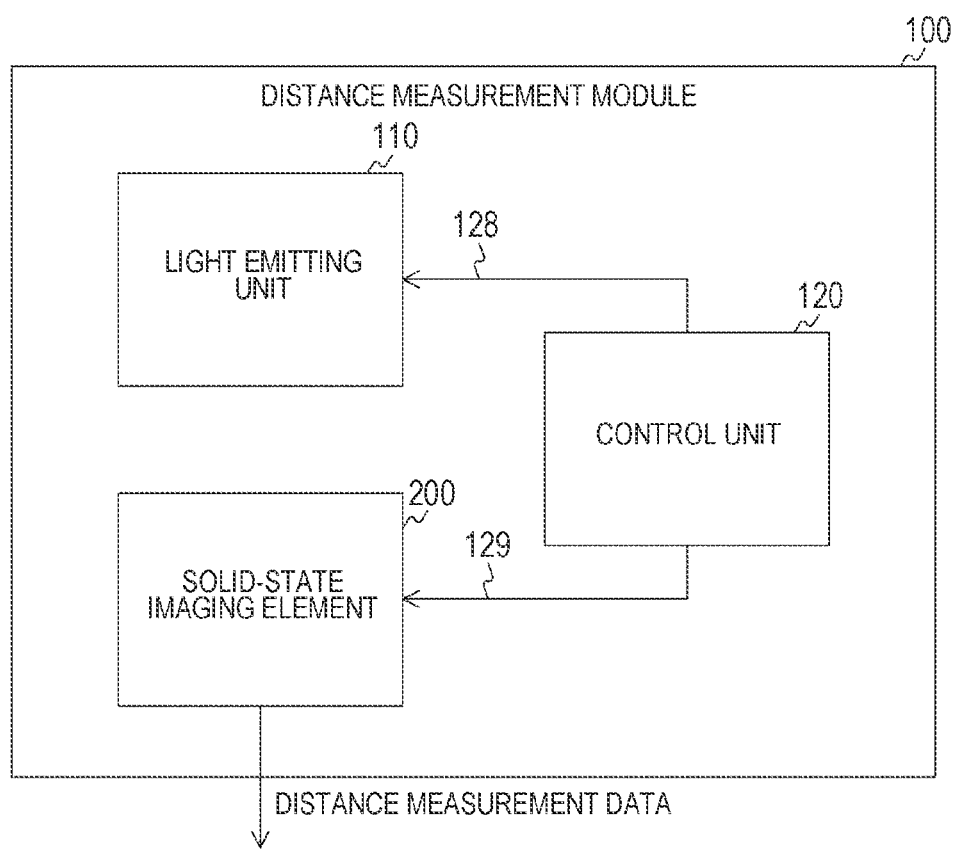
FIG. 1 is a block diagram illustrating a configuration example of a distance measurement module in a first embodiment of the present technology.

FIG. 1 is a block diagram illustrating a configuration example of a distance measurement module 100 in an embodiment of the present technology. The distance measurement module 100 is an electronic device that measures a distance by a ToF method, and includes a light emitting unit 110, a control unit 120, and a solid-state imaging element 200. Note that, the distance measurement module 100 is an example of an electronic device described in the claims.

The light emitting unit 110 intermittently emits irradiation light to irradiate an object. The light emitting unit 110 generates the irradiation light in synchronization with a square wave synchronization signal, for example. Furthermore, for example, a light emitting diode is used as the light emitting unit 110, and near-infrared light or the like is used as the irradiation light. Note that, the motion signal is not limited to the square wave as long as the motion signal is a periodic signal. For example, the synchronization signal may be a sine wave. Furthermore, the irradiation light is not limited to the near-infrared light, and may be visible light or the like.

The control unit 120 controls the light emitting unit 110 and the solid-state imaging element 200. The control unit 120 generates a synchronization signal and supplies the synchronization signal to the light emitting unit 110 and the solid-state imaging element 200 via signal lines 128 and 129. A frequency of the synchronization signal is, for example, 20 megahertz (MHz). Note that, the frequency of the synchronization signal is not limited to 20 megahertz (MHz) and may be 5 megahertz (MHz) or the like.

The solid-state imaging element 200 receives reflected light with respect to intermittent irradiation light and measures a distance to an object by the ToF method. The solid-state imaging element 200 generates distance measurement data indicating the measured distance and outputs the distance measurement data to the outside.

[Configuration Example of Solid-State Imaging Element]

Figure 2:
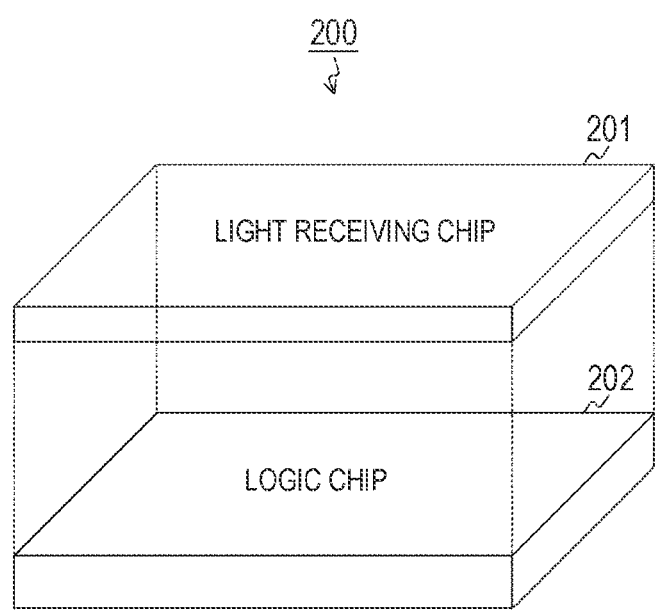
FIG. 2 is a diagram illustrating an example of a stacked structure of a solid-state imaging element in the first embodiment of the present technology.

FIG. 2 is a diagram illustrating an example of a stacked structure of the solid-state imaging element 200 in the embodiment of the present technology. The solid-state imaging element 200 includes a light receiving chip 201 and a logic chip 202 stacked on the light receiving chip 201. A signal line for transmitting a signal is provided between these chips.

[Configuration Example of Light Receiving Chip]

Figure 3:
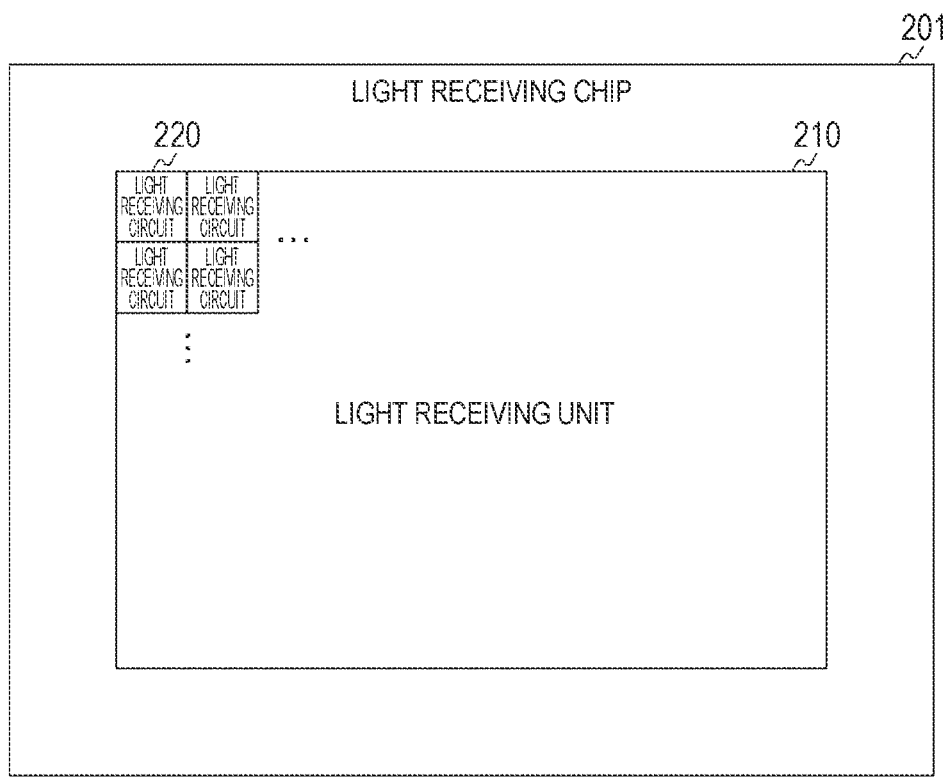
FIG. 3 is a plan view illustrating a configuration example of a light receiving chip in the first embodiment of the present technology.

FIG. 3 is a plan view illustrating a configuration example of the light receiving chip 201 in the embodiment of the present technology. The light receiving chip 201 is provided with a light receiving unit 210, and the light receiving unit 210 is provided with a plurality of light receiving circuits 220 in a two-dimensional lattice pattern. Details of the light receiving circuits 220 will be described later.

[Configuration Example of Logic Chip]

Figure 4:
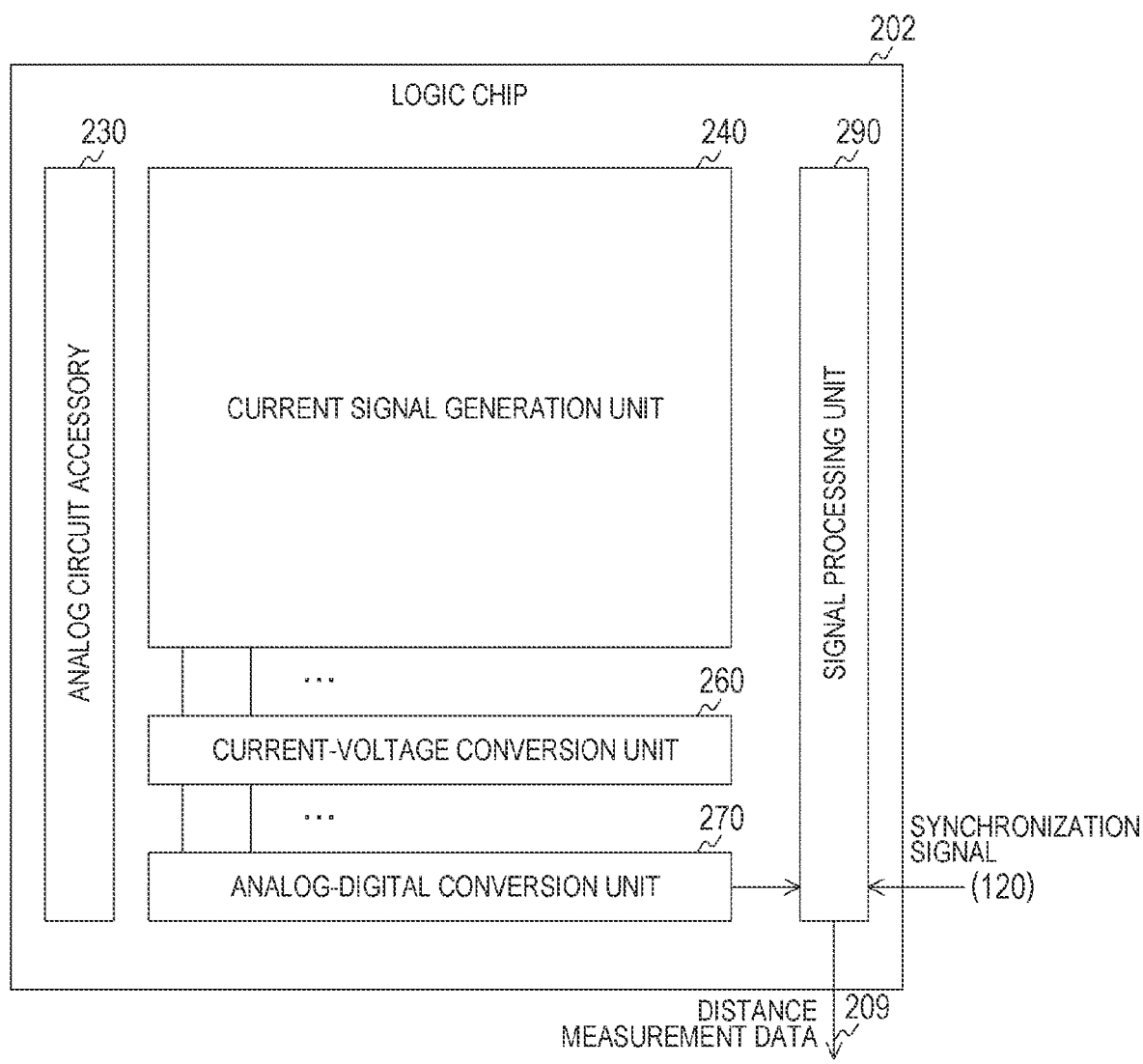
FIG. 4 is a plan view illustrating a configuration example of a logic chip in the first embodiment of the present technology.

FIG. 4 is a block diagram illustrating a configuration example of the logic chip 202 in the embodiment of the present technology. In the logic chip 202, an analog circuit accessory 230, a current signal generation unit 240, a current-voltage conversion unit 260, an analog-digital conversion unit 270, and a signal processing unit 290 are arranged.

The analog circuit accessory 230 controls operations of the analog-digital conversion unit 270 and the signal processing unit 290. For example, the analog circuit accessory 230 supplies a bias voltage, a bias current, a clock signal, and the like.

The current signal generation unit 240 generates a current signal depending on the number of photons incident on the light receiving unit 210. The current signal generation unit 240 supplies the current signal to the current-voltage conversion unit 260.

The current-voltage conversion unit 260 converts the current signal into a voltage signal and outputs the voltage signal to the analog-digital conversion unit 270.

The analog-digital conversion unit 270 converts the voltage signal into a digital signal indicating the number of photons incident. The analog-digital conversion unit 270 supplies the digital signal to the signal processing unit 290.

The signal processing unit 290 processes the digital signal in synchronization with the synchronization signal from the control unit 120 and generates distance measurement data.

[Configuration Example of Current Signal Generation Unit]

Figure 5:
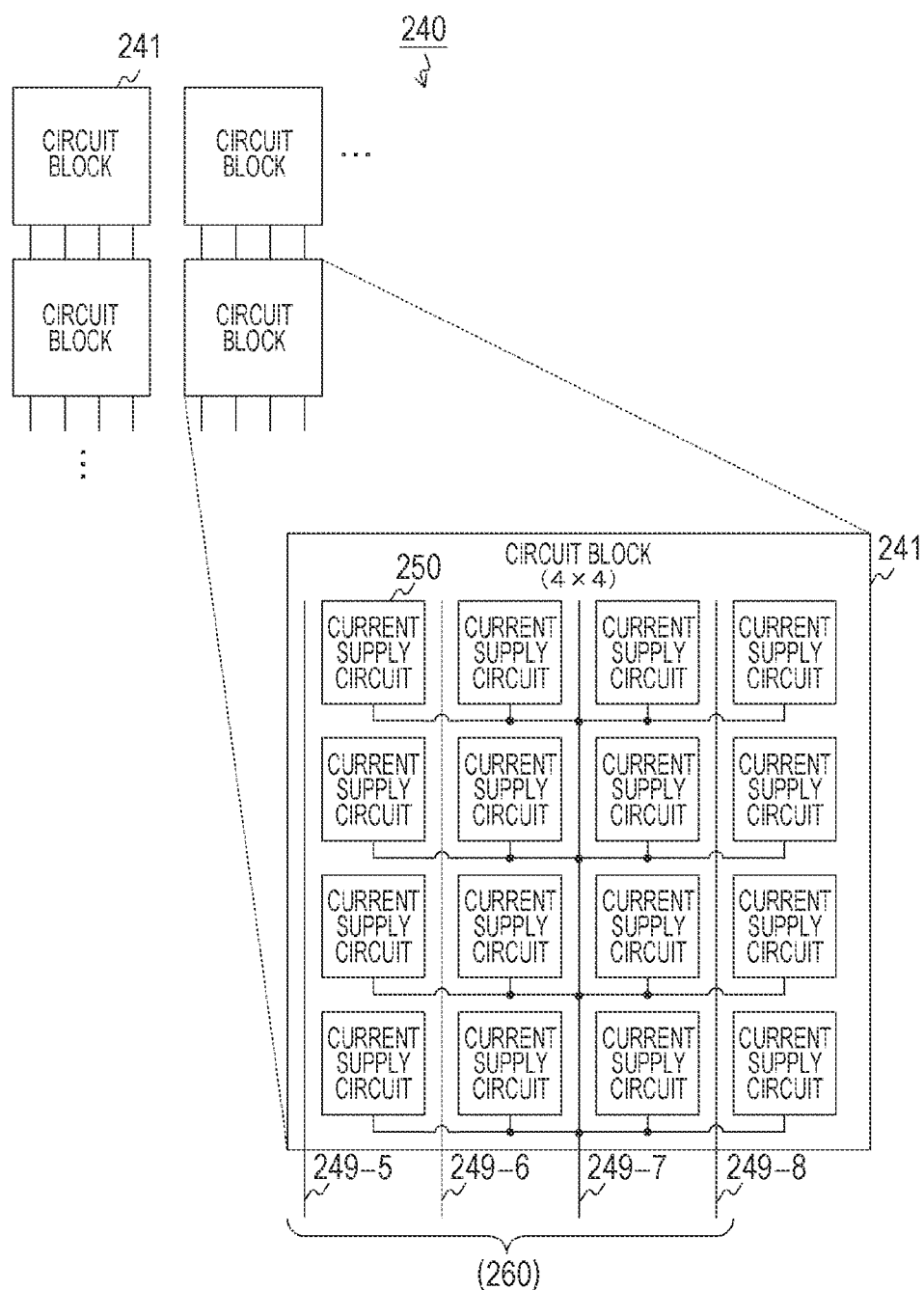
FIG. 5 is a block diagram illustrating a configuration example of a current signal generation unit in the first embodiment of the present technology.

FIG. 5 is a block diagram illustrating a configuration example of the current signal generation unit 240 in a first embodiment of the present technology. A plurality of circuit blocks 241 is arranged in the current signal generation unit 240. A plurality of current supply circuits 250 is arranged in each of the circuit blocks 241. For example, in the circuit block 241, the current supply circuits 250 of four rows×four columns are arranged in a two-dimensional lattice pattern. The current supply circuits 250 are provided for the respective light receiving circuits 220 of the light receiving chip 201, and are connected to the corresponding light receiving circuits 220 via signal lines. A circuit including one of the light receiving circuits 220 and one of the current supply circuits 250 corresponding to the one light receiving circuit 220 is used to generate distance measurement data for one pixel in a distance measurement image.

[Configuration Example of Pixel]

Figure 6:
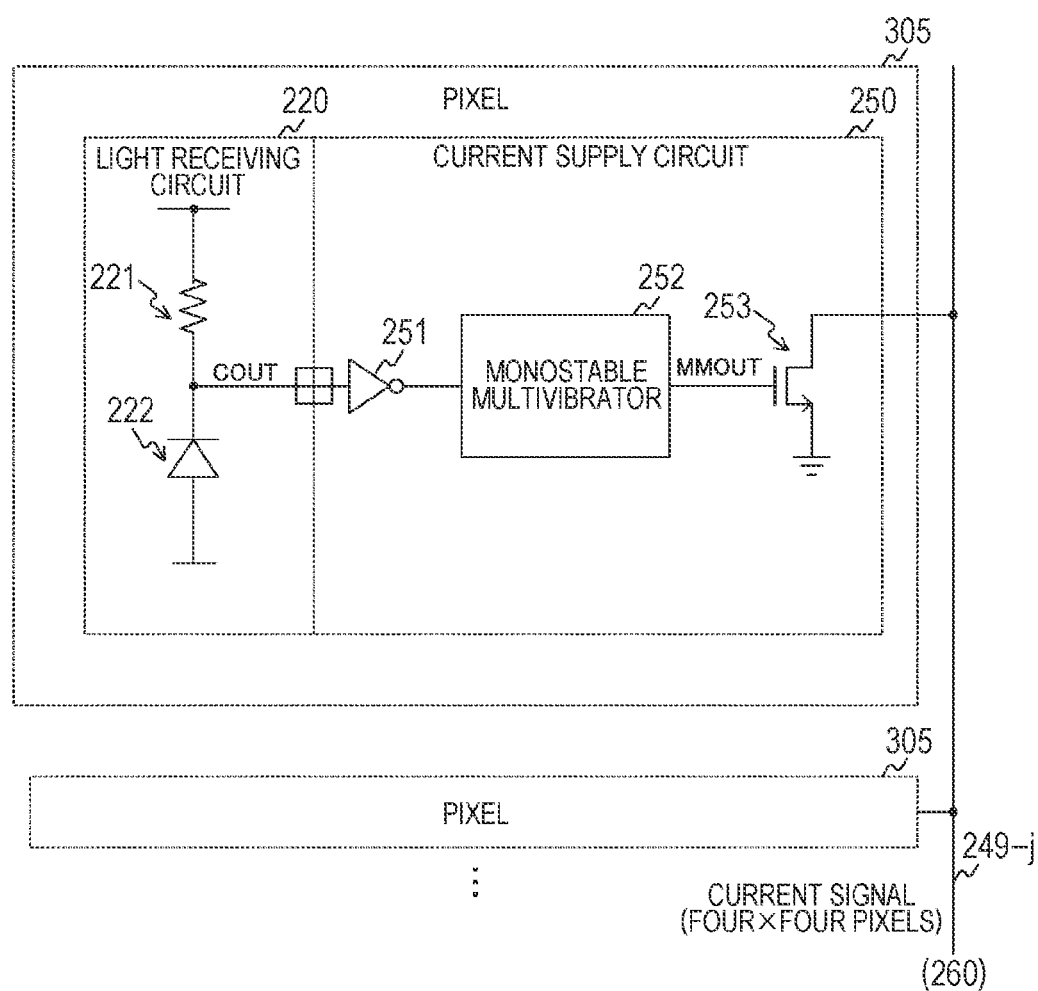
FIG. 6 is a circuit diagram illustrating a configuration example of a pixel in the first embodiment of the present technology.

FIG. 6 is a circuit diagram illustrating a configuration example of a pixel 305 in the first embodiment of the present technology. A circuit including the light receiving circuit 220 in the light receiving chip 201 and the corresponding current supply circuit 250 functions as one pixel 305. Furthermore, the current supply circuits 250 of four rows×four columns in the circuit block 241 are connected in common to one signal line 249-j (j is an integer). The signal line 249-j functions as a bus that transmits a signal from each of the current supply circuits 250.

The light receiving circuit 220 includes a resistor 221 and a photoelectric conversion element 222. The resistor 221 and the photoelectric conversion element 222 are connected in series between a power supply terminal and a ground terminal.

The photoelectric conversion element 222 photoelectrically converts incident light and outputs a photocurrent. The cathode of the photoelectric conversion element 222 is connected to a terminal of a power supply potential via the resistor 221, and the anode is connected to a terminal (ground terminal or the like) of a potential lower than the power supply potential. As a result, a reverse bias is applied to the photoelectric conversion element 222. Furthermore, the photocurrent flows in a direction from the cathode to the anode of the photoelectric conversion element 222.

As the photoelectric conversion element 222, for example, an avalanche photodiode is used that is capable of detecting presence or absence of incidence of one photon by amplifying a photocurrent. Furthermore, it is desirable to use an SPAD among avalanche diodes.

One end of the resistor 221 is connected to the terminal of the power supply potential, and the other end is connected to the cathode of the photoelectric conversion element 222. Each time a photon is incident, a photocurrent flows through the resistor 221, and a cathode potential COUT of the photoelectric conversion element 222 drops to a value lower than the power supply potential.

The current supply circuit 250 supplies a current signal to the current-voltage conversion unit 260 via the signal line 249-j when the cathode potential of the photoelectric conversion element 222 drops (in other words, a photon is incident). The current supply circuit 250 includes an inverter 251, a monostable multivibrator 252, and a transistor 253. As the transistor 253, for example, an n-channel metal oxide semiconductor (nMOS) transistor is used.

The inverter 251 inverts a signal of the cathode potential COUT and supplies an inverted signal to the monostable multivibrator 252.

The monostable multivibrator 252 outputs a pulse signal MMOUT having a predetermined pulse width to the transistor 253 depending on an inverted signal of the high level from the inverter 251. Note that, a circuit including the inverter 251 and the monostable multivibrator 252 is an example of a second pulse signal generation unit described in the claims.

The transistor 253 generates a current signal depending on the pulse signal MMOUT and supplies the current signal to the signal line 249-j.

Note that, the pixel 305 generates a pulse signal by the inverter 251 and the monostable multivibrator 252, but is not limited to have this configuration. The pixel 305 can also generate a pulse signal only by the inverter 251.

Figure 7:
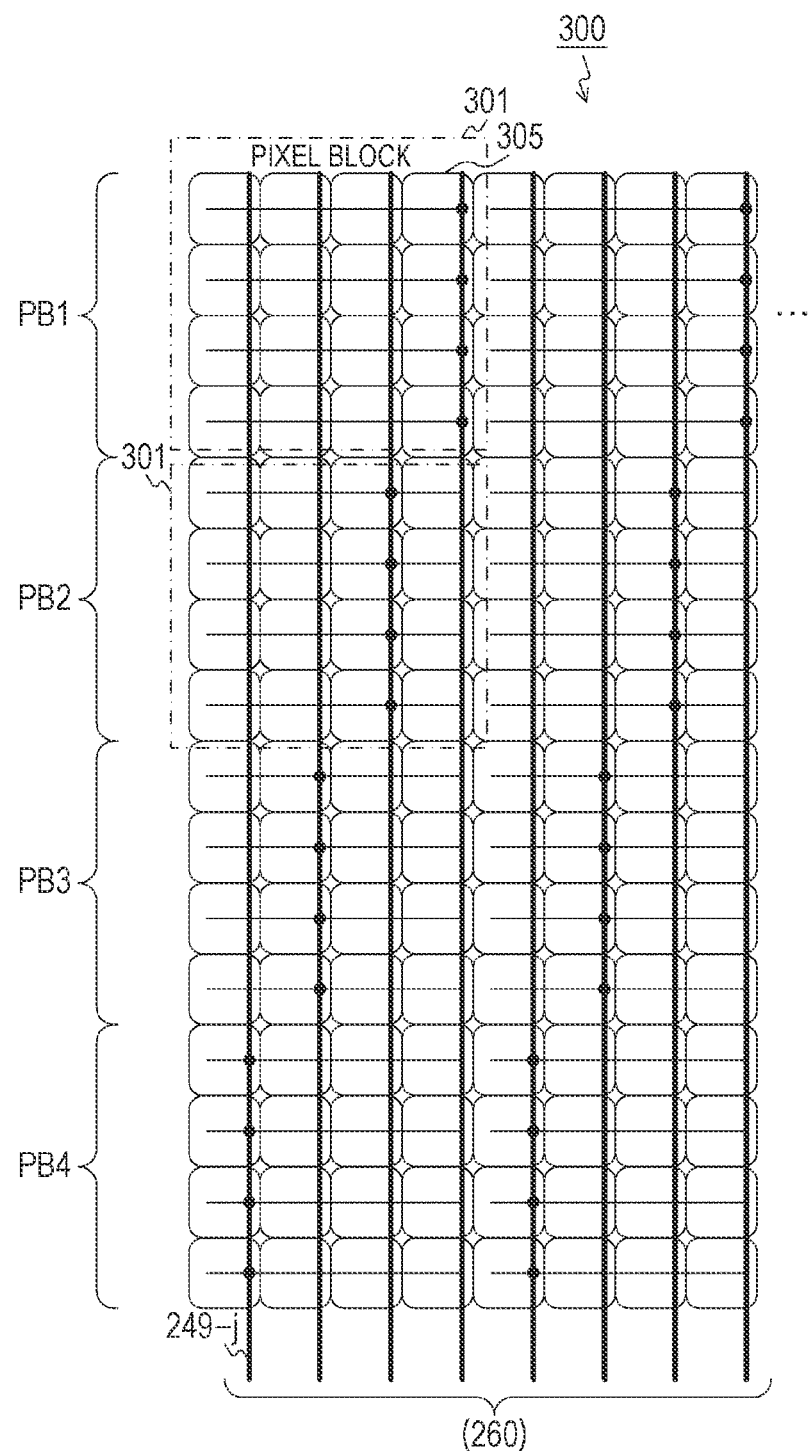
FIG. 7 is a plan view illustrating a wiring example in a pixel array unit in the first embodiment of the present technology.

FIG. 7 is a plan view illustrating a wiring example in a pixel array unit 300 in the first embodiment of the present technology. A plurality of the pixels 305 is arranged in a two-dimensional lattice pattern in the pixel array unit 300. Furthermore, the pixel array unit 300 is divided into a plurality of pixel blocks 301 each including the pixels 305 of four rows×four columns. Furthermore, the signal line 249-j is wired in the vertical direction in a column j of the pixel 305.

Each signal line 249-j is connected to the pixels 305 in the pixel blocks 301 different from each other. For example, one of the pixel blocks 301 including the first to fourth rows is set as PB1, and one of the pixel blocks 301 including the fifth to eighth rows is set as PB2. One of the pixel blocks 301 including the ninth to twelfth lines is set as PB3, and one of the pixel blocks 301 including thirteenth to sixteenth lines is set as PB4. At this time, the pixel block PB1 is connected to a signal line 249-4, and the pixel block PB2 is connected to a signal line 249-3. Furthermore, the pixel block PB3 is connected to a signal line 249-2, and the pixel block PB4 is connected to a signal line 249-1. A signal line 249-5 and subsequent lines are similarly connected to the pixel blocks 301 different from each other.

The 16 pixels 305 in one of the pixel blocks 301 corresponding to the signal line 249-j are connected in common to the signal line 249-j. Furthermore, each signal line 249-j is connected to the current-voltage conversion unit 260.

With a connection configuration exemplified in the figure, the 16 pixels 305 in each pixel block 301 supply current signals to the signal line 249-j to which the 16 pixels 305 are connected in common. Among these pixels 305, in a case where there are two or more pixels 305 on which photons are incident substantially simultaneously, the current signals generated by the two or more pixels 305 merge in the signal line 249-j and are input to the current-voltage conversion unit 260. The current-voltage conversion unit 260 converts a current signal into a voltage signal by a resistor or the like for each column. As a result, a voltage signal is generated of a level depending on the number of photons incident substantially simultaneously.

[Configuration Example of Analog-Digital Conversion Unit]

Figure 8:
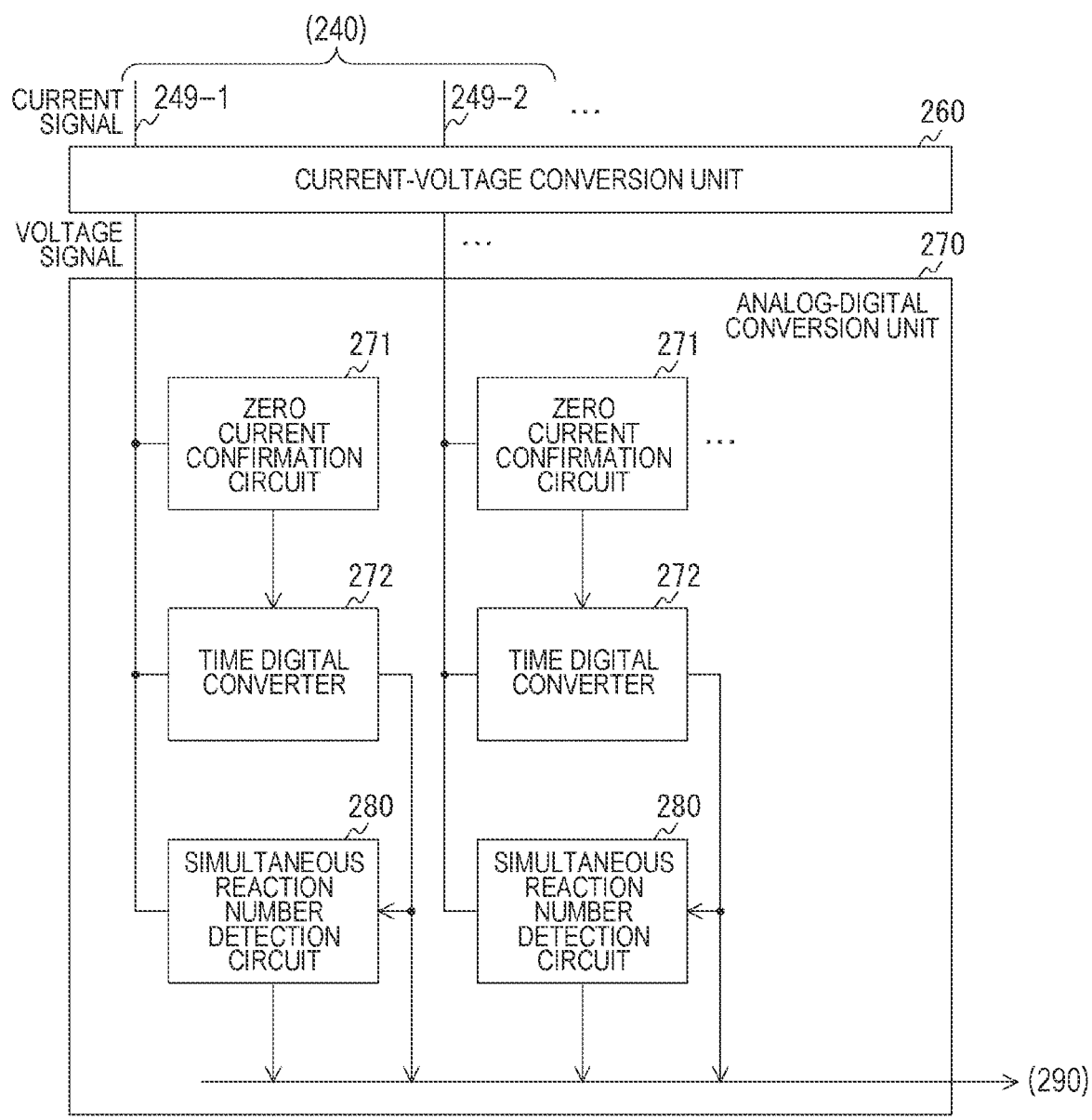
FIG. 8 is a block diagram illustrating a configuration example of an analog-digital conversion unit in the first embodiment of the present technology.

FIG. 8 is a block diagram illustrating a configuration example of the analog-digital conversion unit 270 in the first embodiment of the present technology. The analog-digital conversion unit 270 includes a plurality of zero current confirmation circuits 271, a plurality of time digital converters 272, and a plurality of simultaneous reaction number detection circuits 280. The zero current confirmation circuit 271, the time digital converter 272, and the simultaneous reaction number detection circuit 280 are arranged for each column and are connected in common to the signal line 249-j of a corresponding column.

The zero current confirmation circuit 271 confirms whether or not a current flowing through the corresponding signal line 249-j is zero, in other words, whether or not a current signal is output via the signal line 249-j. The zero current confirmation circuit 271 supplies a confirmation result to the time digital converter 272.

In a case where a zero current is confirmed for the corresponding signal line 249-j, the time digital converter 272 converts an elapsed time from a light emission timing of the light emitting unit 110 to a drop of the cathode potential into a digital value. Furthermore, the time digital converter 272 supplies the converted digital value to the simultaneous reaction number detection circuit 280 and the signal processing unit 290.

The simultaneous reaction number detection circuit 280 detects the number of photons incident substantially simultaneously in a corresponding pixel block 301 as the number of simultaneous reactions on the basis of the voltage signal from the signal line 249-j and the digital value from the time digital converter 272. Here, "substantially simultaneously" means a case where incident timings of a plurality of photons are completely simultaneous, or a case where the incident timings are not completely simultaneous, but there is only a time difference in which a part of pulse periods of corresponding pulse signals overlap each other. The simultaneous reaction number detection circuit 280 supplies a digital signal indicating a detection result to the signal processing unit 290.

The signal processing unit 290 generates a histogram for each pixel block 301 on the basis of the detection result from the analog-digital conversion unit 270. The histogram represents detection frequency for each timing when the number of simultaneous reactions is detected. Furthermore, the detection frequency is weighted by a larger weight as the number of simultaneous reactions is larger. Then, the signal processing unit 290 detects a timing of a peak value of the histogram as an incident timing of the reflected light, and converts a round-trip time from an irradiation timing of the irradiation light to the incident timing of the reflected light into the distance to the object.

[Configuration Example of Simultaneous Reaction Number Detection Circuit]

Figure 9:
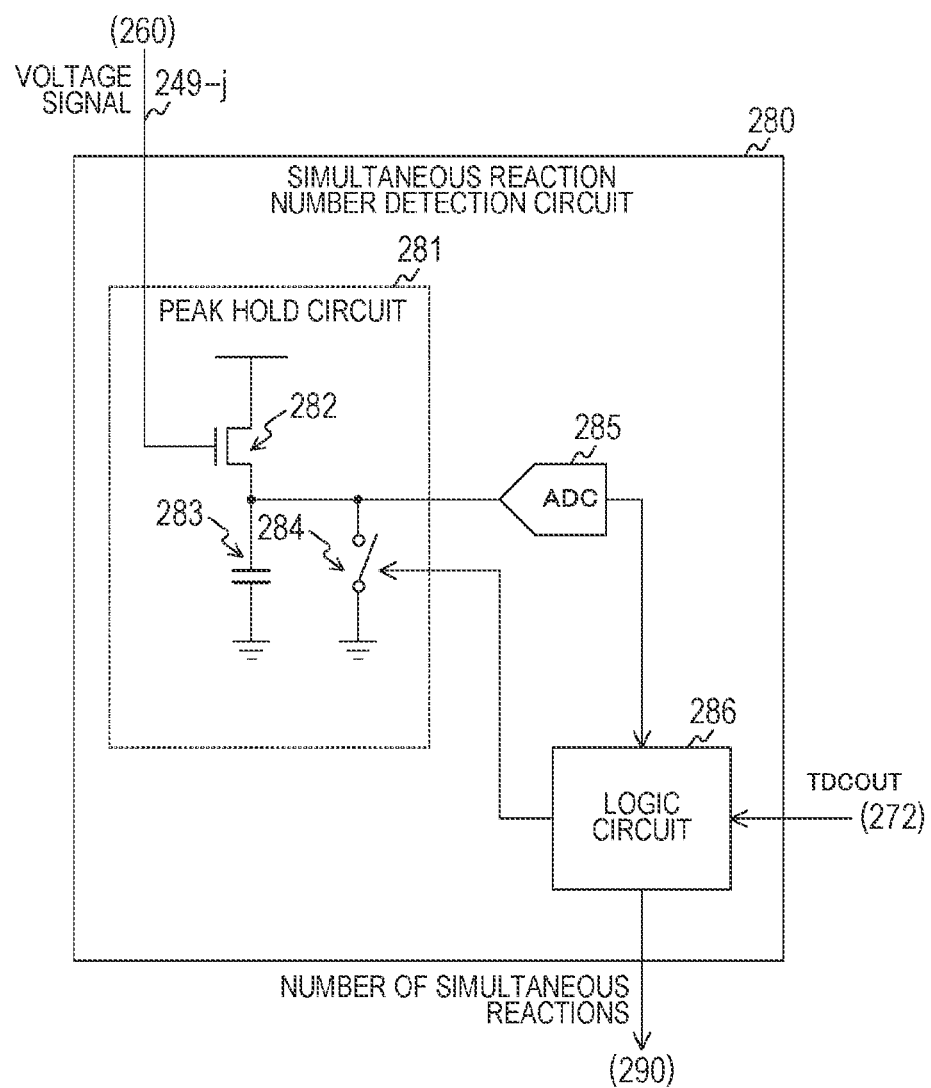
FIG. 9 is a circuit diagram illustrating a configuration example of a simultaneous reaction number detection circuit in the first embodiment of the present technology.

FIG. 9 is a circuit diagram illustrating a configuration example of the simultaneous reaction number detection circuit 280 in the first embodiment of the present technology. The simultaneous reaction number detection circuit 280 includes a peak hold circuit 281, an analog to digital converter (ADC) 285, and a logic circuit 286.

The peak hold circuit 281 holds a peak value of the voltage signal transmitted via the corresponding signal line 249-j. The peak hold circuit 281 includes an nMOS transistor 282, a capacitor 283, and a reset switch 284.

The nMOS transistor 282 and the capacitor 283 are inserted in series between the power supply terminal and the ground terminal. The gate of the nMOS transistor 282 is connected to the corresponding signal line 249-j. Furthermore, a connection point between the nMOS transistor 282 and the capacitor 283 is connected to the reset switch 284 and the ADC 285.

The reset switch 284 initializes an amount of charge of the capacitor 283 in accordance with control of the logic circuit 286.

The ADC 285 converts a potential at a connection point between the nMOS transistor 282 and the capacitor 283 into a digital signal and supplies the digital signal to the logic circuit 286.

The logic circuit 286 detects the number of simultaneous reactions on the basis of a digital value (that is, a voltage value of the voltage signal) indicated by the ADC 285. For example, in a case where the number of simultaneous reactions up to 16 is detected, 16 threshold values THk (k is an integer of 1 to 16) are set in advance, and the voltage value is converted into k in a case where the voltage value is less than THk, or the like. The logic circuit 286 supplies the detected number of simultaneous reactions to the signal processing unit 290.

Furthermore, when a digital value TDCOUT from the time digital converter 272 is a predetermined value (for example, "1"), the logic circuit 286 controls the reset switch 284 to cause the capacitor 283 to be initialized. As a result, the peak value of the voltage signal within the elapsed time measured by the time digital converter 272 is held in the peak hold circuit 281.

Figure 10:
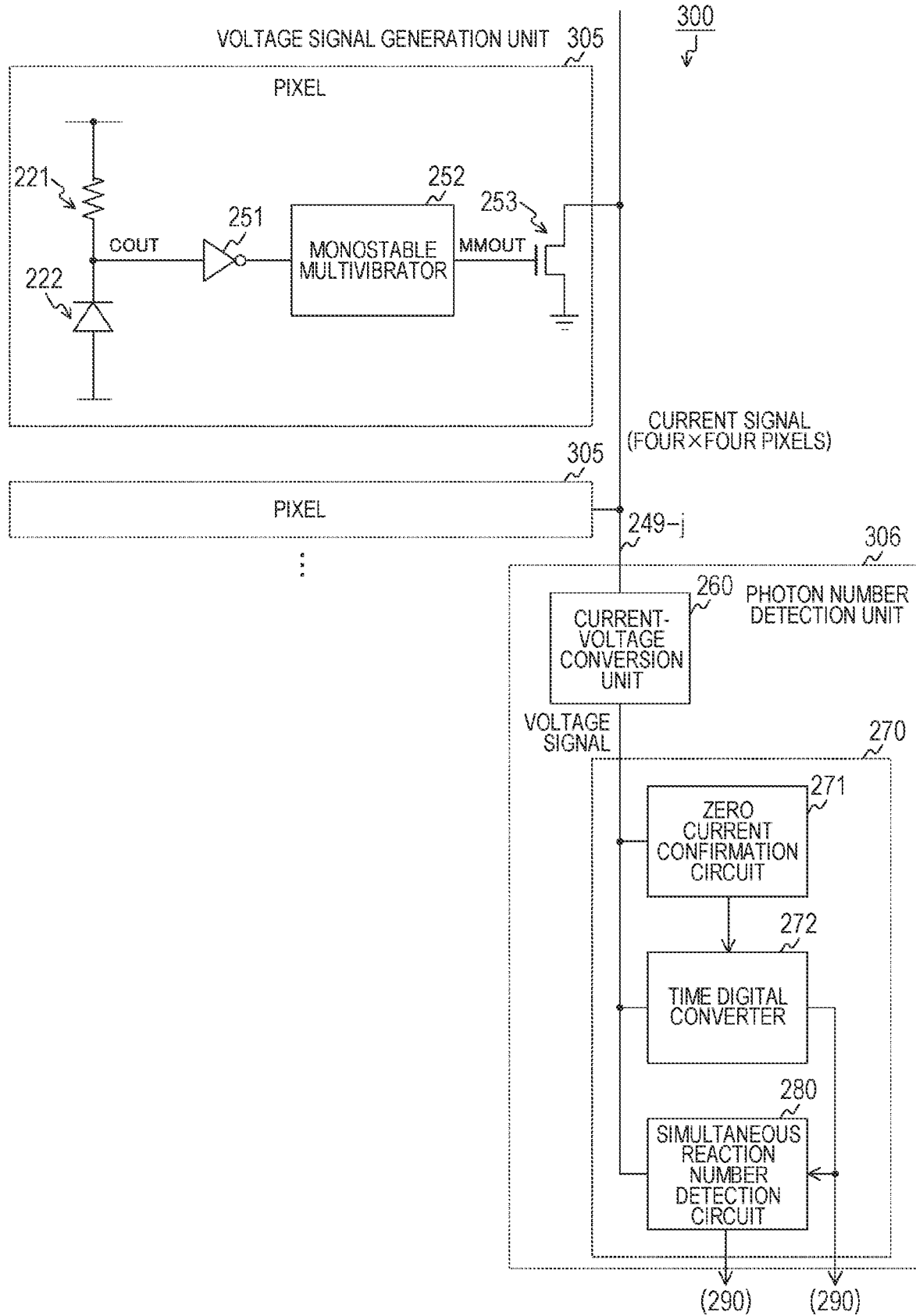
FIG. 10 is a diagram illustrating a configuration example of the pixel array unit, a current-voltage conversion unit, and the analog-digital conversion unit in the first embodiment of the present technology.

FIG. 10 is a diagram illustrating a configuration example of the pixel array unit 300, the current-voltage conversion unit 260, and the analog-digital conversion unit 270 in the first embodiment of the present technology. The current-voltage conversion unit 260 and the analog-digital conversion unit 270 function as a photon number detection unit 306 that detects the number of simultaneous reactions.

The pixel array unit 300 is provided with the pixel block 301 in which the plurality of pixels 305 is arranged, and the signal line 249-j to which the pixels 305 are connected in common. Each of the pixels 305 generates a current signal as an analog signal depending on incidence of a photon. The photon number detection unit 306 detects the number of photons (that is, the number of simultaneous reactions) incident substantially simultaneously into the pixel block 301 on the basis of the analog signal (that is, the current signal).

The current-voltage conversion unit 260 in the photon number detection unit 306 converts the current signal into the voltage signal. Furthermore, the analog-digital conversion unit 270 in the photon number detection unit 306 converts the voltage signal into the number of simultaneous reactions.

Furthermore, the zero current confirmation circuit 271 in the analog-digital conversion unit 270 confirms whether or not the current signal is output. In a case where no current is output, the time digital converter 272 in the analog-digital conversion unit 270 converts the elapsed time from the light emission timing to the drop of the cathode potential into the digital value. The simultaneous reaction number detection circuit 280 in the analog-digital conversion unit 270 detects the number of simultaneous reactions on the basis of the digital value and the voltage signal.

Here, a comparative example is assumed in which a signal line to the photon number detection unit 306 is individually wired for each pixels 305. In the comparative example, as the pixel 305 is miniaturized, the number of wiring lines of the signal lines between the pixel 305 and the photon number detection unit 306 increases. When the number of wiring lines increases, the signal line needs to be thinned, and it becomes difficult to ensure a transmission band. Furthermore, due to the increase in the number of wiring lines, the degree of freedom in designing the wirings decreases, and the skew increases. As described above, miniaturization of pixels becomes difficult due to the increase in the number of wiring lines.

On the other hand, in the configuration in which the signal line 249-*j* is shared by the plurality of pixels 305, the increase in the number of wiring lines can be suppressed, so that miniaturization of pixels is facilitated.

Figure 11:
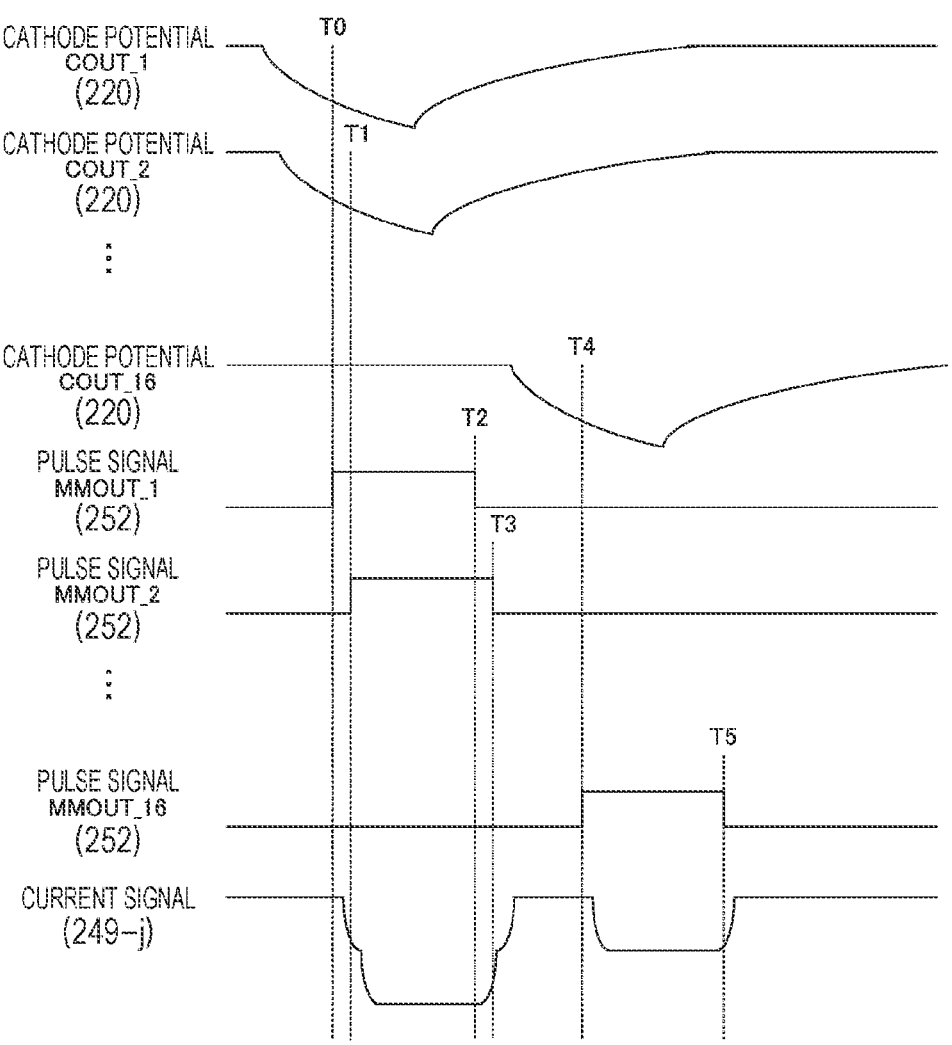
FIG. 11 is a timing chart illustrating an example of operation of the solid-state imaging element in the first embodiment of the present technology.

FIG. 11 is a timing chart illustrating an example of operation of the solid-state imaging element 200 in the first embodiment of the present technology. For the 16 pixels 305 in the pixel block 301, cathode potentials COUT_1 to COUT_16 are set, and pulse signals MMOUT_1 to MMOUT_16 are set.

It is assumed that the cathode potential COUT_1 decreases depending on incidence of a photon immediately before timing T0, and the cathode potential COUT_2 decreases depending on incidence of a photon immediately before timing T1. In this case, the pulse signal MMOUT_1 having a pulse width of from the timing T0 to timing T2 is generated, and immediately after that, the pulse signal MMOUT_2 having a pulse width of from the timing T1 to timing T3 is generated. Then, immediately after the timing T1, a current signal of a level of two photons is output via the signal line 249-*j*. The simultaneous reaction number detection circuit 280 detects "2" as the number of simultaneous reactions on the basis of a peak value of the current signal.

When a zero current is confirmed after the timing T3, the time digital converter 272 is initialized. Then, immediately before timing 14, it is assumed that the cathode potential COUT_16 decreases depending on incidence of a photon. In this case, the pulse signal MMOUT_16 having a pulse width of from the timing 14 to timing T5 is generated, and immediately after the timing 14, a current signal of a level of one photon is output via the signal line 249-*j*. The simultaneous reaction number detection circuit 280 detects "1" as the number of simultaneous reactions on the basis of a peak value of the current signal.

Figure 12:
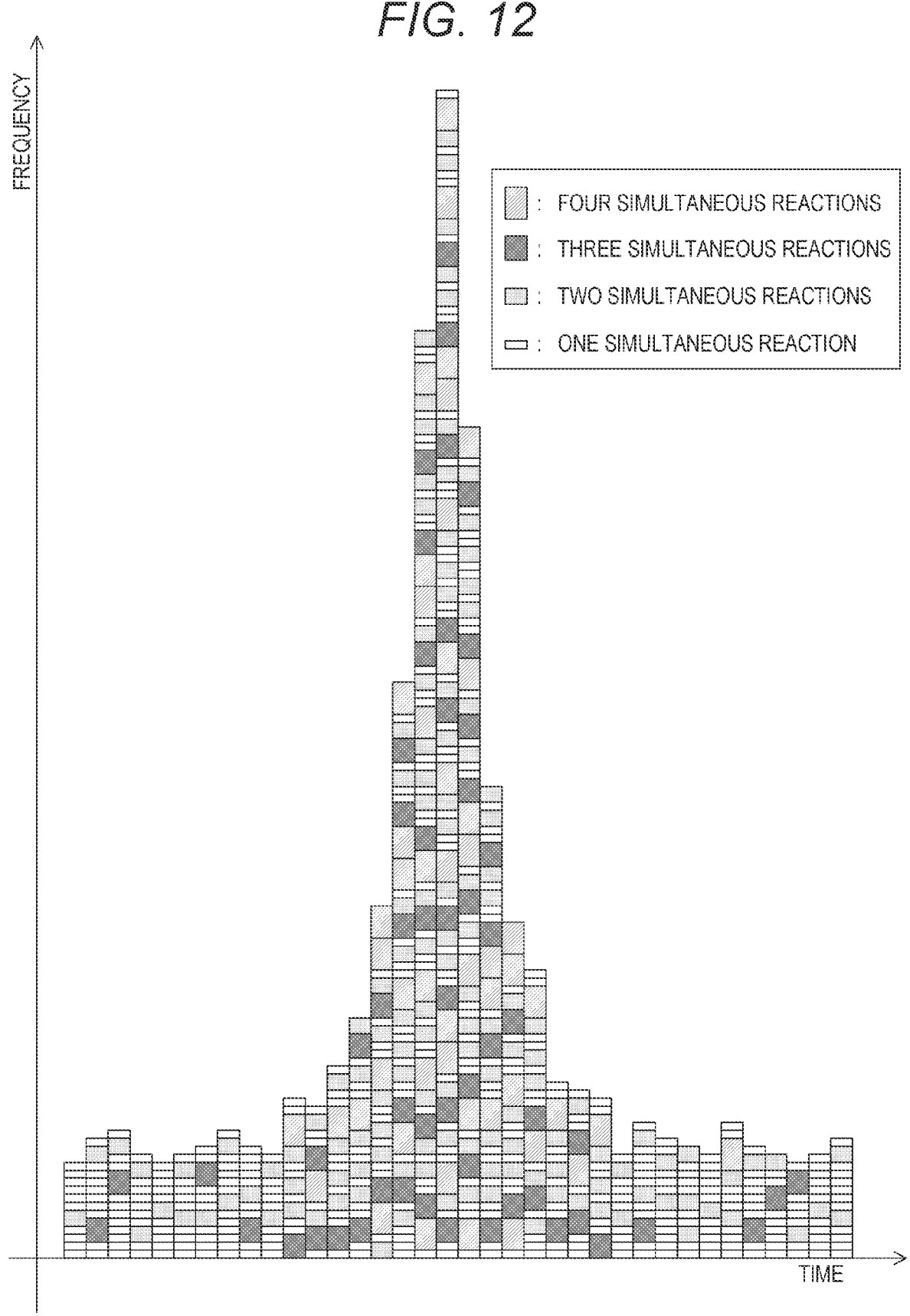
FIG. 12 is a diagram illustrating an example of a histogram in the first embodiment of the present technology.

FIG. 12 is a diagram illustrating an example of a histogram in the first embodiment of the present technology. The signal processing unit 290 generates a histogram on the basis of a detection result of a predetermined number of simultaneous reactions for the pixel block 301.

It is assumed that four pixels are arranged in the pixel block 301. In this case, "0" to "4" are detected as the number of simultaneous reactions. In the figure, the vertical axis represents the detection frequency of the number of simultaneous reactions, and the horizontal axis represents the detected time. The detection frequency is weighted by a larger value as the number of simultaneous reactions is larger. For example, when a weight of the detection frequency with the number of simultaneous reactions "1" is "w" (w is a real number), a weight "4w" is set for the detection frequency with the number of simultaneous reactions "4".

Here, a comparative example is assumed in which the number of photons incident substantially simultaneously in the pixel block 301 is not detected, and whether or not a photon is incident on the pixel is detected for each pixel.

Figure 13:
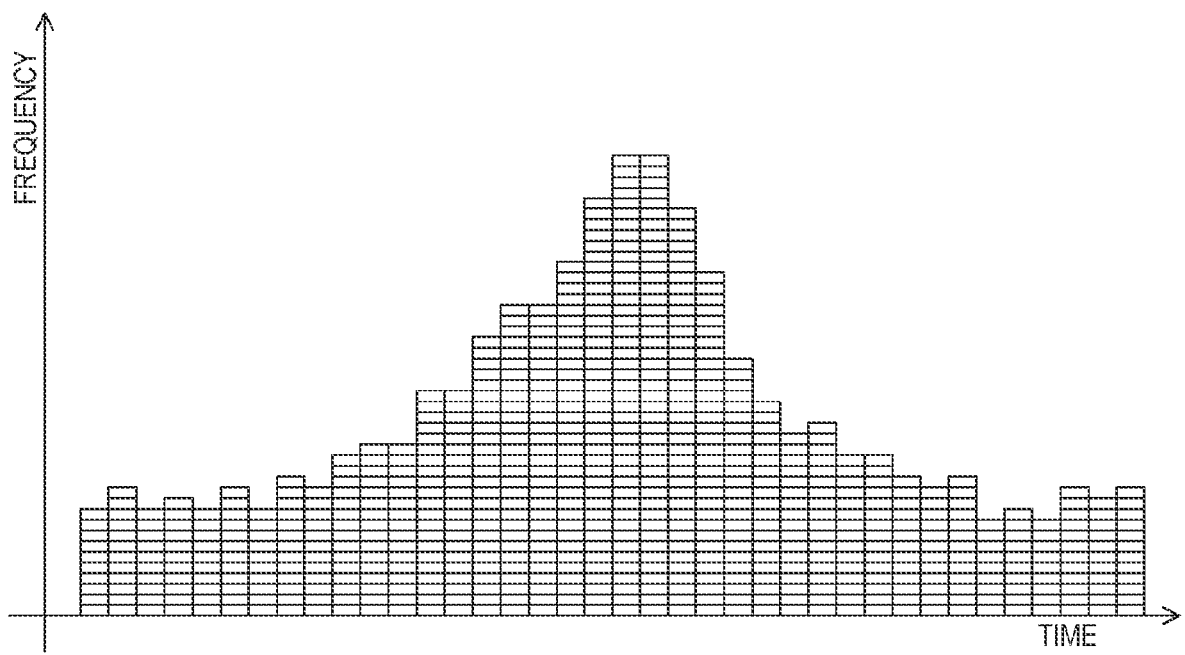
FIG. 13 is a diagram illustrating an example of a histogram in a comparative example.

FIG. 13 is a diagram illustrating a histogram of the comparative example. Comparing FIG. 12 with FIG. 13, in a case where the number of simultaneous reactions of a plurality of photons is detected, the peak of the histogram is more conspicuous than that of the comparative example. This is because, for example, in a case where four photons are simultaneously incident, all of the four photons can be detected when the number of simultaneous reactions is detected, whereas in the comparative example, only one of the four photons can be detected. Thus, detection accuracy of the peak value of the histogram is improved by the detection of the number of simultaneous reactions, and distance measurement accuracy can be increased by the improvement of the detection accuracy.

[Operation Example of Solid-State Imaging Element]

Figure 14:
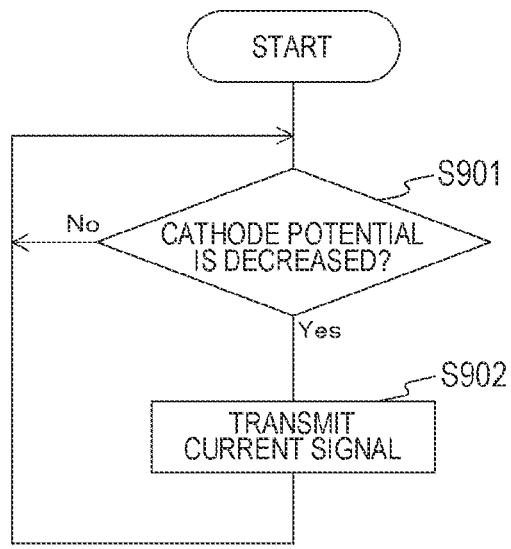
FIG. 14 is a flowchart illustrating an example of operation of the pixel in the first embodiment of the present technology.

FIG. 14 is a flowchart illustrating an example of operation of the pixel 305 in the first embodiment of the present technology. The operation is started, for example, when a predetermined application for performing distance measurement is executed. First, the pixel 305 determines whether or not the cathode potential of the photoelectric conversion element 222 is decreased (in other words, a photon is incident) (step S901). In a case where the cathode potential is decreased (step S901: Yes), the pixel 305 generates a current signal and transmits the current signal via a signal line (step S902). In a case where the cathode potential is not decreased (step S901: No), or after step S902, the pixel 305 repeatedly executes step S901 and the subsequent step.

Figure 15:
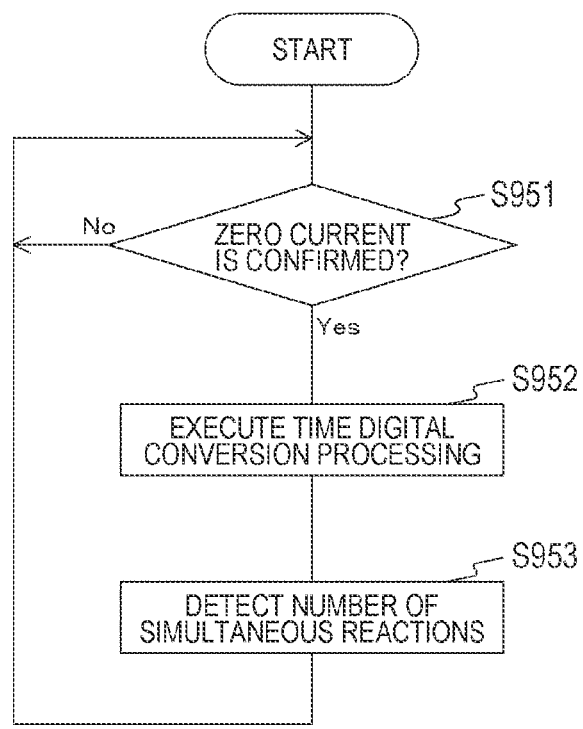
FIG. 15 is a flowchart illustrating an example of operation of the analog-digital conversion unit in the first embodiment of the present technology.

FIG. 15 is a flowchart illustrating an example of operation of the analog-digital conversion unit 270 in the first embodiment of the present technology. The operation is started, for example, when a predetermined application for performing distance measurement is executed. The analog-digital conversion unit 270 determines whether or not a zero current is confirmed (step S951).

In a case where the zero current is confirmed (step S951: Yes), the analog-digital conversion unit 270 executes time digital conversion processing (step S952) and detects the number of simultaneous reactions (step S953). In a case where the zero current is not confirmed (step S951: No), or after step S953, the analog-digital conversion unit 270 repeatedly executes step S951 and the subsequent steps.

As described above, in the first embodiment of the present technology, the analog-digital conversion unit 270 detects the number of simultaneous reactions on the basis of the current signal transmitted via the signal line 249-*j* to which the plurality of pixels 305 is connected in common, and thus it is not necessary to wire the signal line for each pixel. As a result, the number of wiring lines can be reduced and miniaturization of pixels can be facilitated as compared with a case where the signal line is wired for each pixel.

[Modification]

In the above-described first embodiment, the pixels 305 of four rows×four columns are arranged in the pixel block 301, but in this configuration, distance measurement points (that is, resolution) per unit area may be insufficient. The solid-state imaging element 200 of a modification of the first embodiment is different from that of the first embodiment in that the number of pixels in a pixel block 301 is reduced to improve resolution.

Figure 16A:
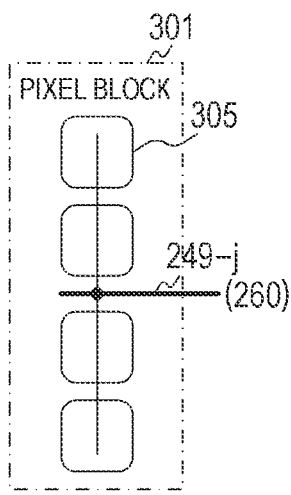
FIGS. 16A, 16B, and 16C are plan view illustrating an example of a pixel block in which one column or one row is arranged in a modification of the first embodiment of the present technology.
Figure 16B:
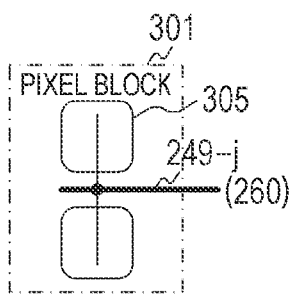
Figure 16C:
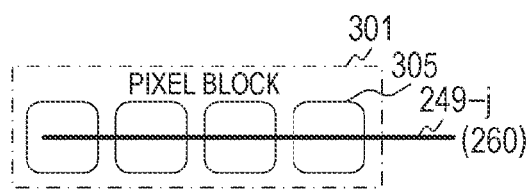

FIGS. 16A, 16B, and 16C are plan view illustrating an example of the pixel block 301 in which one column or one row is arranged in the modification of the first embodiment of the present technology. FIG. 16A is an example of the pixel block 301 in which the pixels 305 of four rows×one column are arranged. FIG. 16B is an example of the pixel block 301 in which the pixels 305 of two rows×one column are arranged. FIG. 16C is an example of the pixel block 301 in which the pixels 305 of one row×four columns are arranged.

Figure 17A:
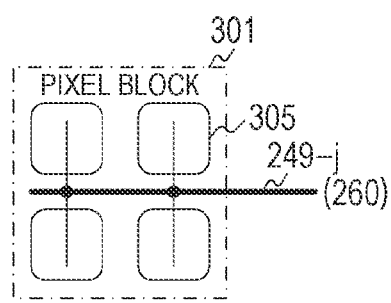
FIGS. 17A and 17B are plan view illustrating an example of the pixel block in which two rows×two columns are arranged in the modification of the first embodiment of the present technology.
Figure 17B:
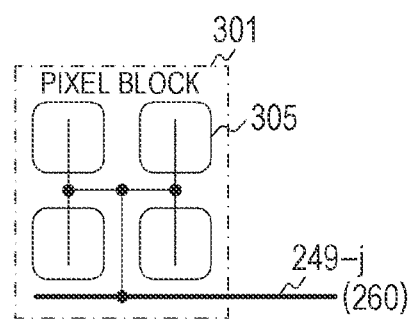

FIGS. 17A and 17B are plan view illustrating an example of the pixel block 301 in which two rows×two columns are arranged in the modification of the first embodiment of the present technology. FIG. 17A is an example of the pixel block 301 in which the pixels 305 of two rows×two columns are arranged and signal lines are wired in a fish bone shape. FIG. 17B is an example of the pixel block 301 in which the pixels 305 of two rows×two columns are arranged and signal lines are wired in an H shape.

Figure 18A:
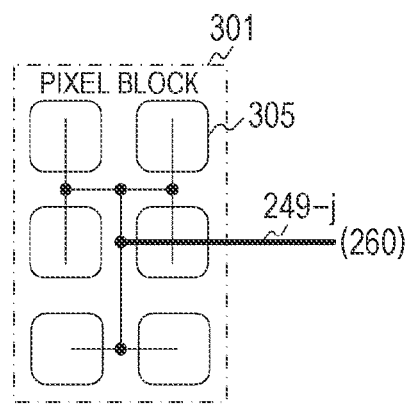
FIGS. 18A and 18B are plan view view illustrating an example of the pixel block in which three rows×two columns or three rows×three columns are arranged in the modification of the first embodiment of the present technology.
Figure 18B:
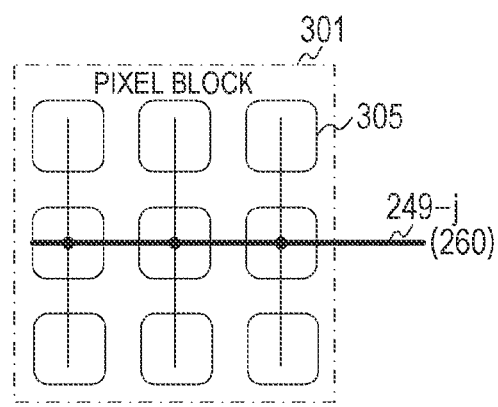

FIGS. 18A and 18B are plan view illustrating an example of the pixel block 301 in which three rows×two columns and three rows×three columns are arranged in a modification of the first embodiment of the present technology. FIG. 18A is an example of the pixel block 301 in which the pixels 305 of three rows×two columns are arranged and signal lines are wired in an H shape. In the figure, 18B is an example of the pixel block 301 in which the pixels 305 of three rows×three columns are arranged and signal lines are wired in a fish bone shape.

As exemplified in FIGS. 16A, 16B, 16C, 17A, 17B, 18A and 18B, by reducing the number of pixels to less than four rows×four columns, the number (resolution) of distance measurement points in the horizontal direction and the vertical direction can be increased.

Figure 19A:
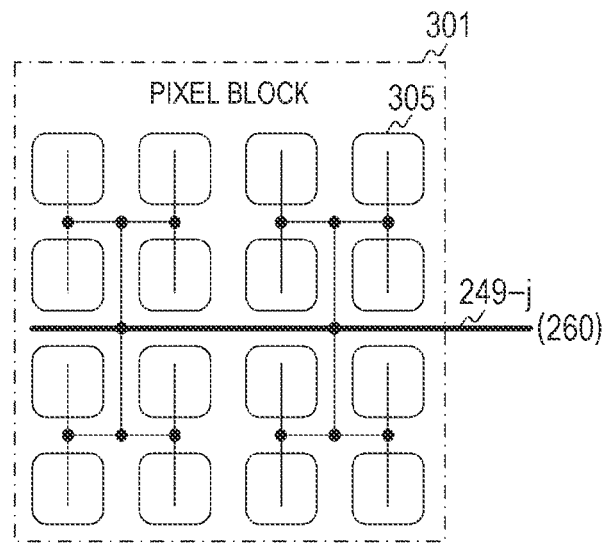
FIGS. 19A and 19B are plan view illustrating an example of the pixel block arranged in four rows×four columns in the modification of the first embodiment of the present technology.
Figure 19B:
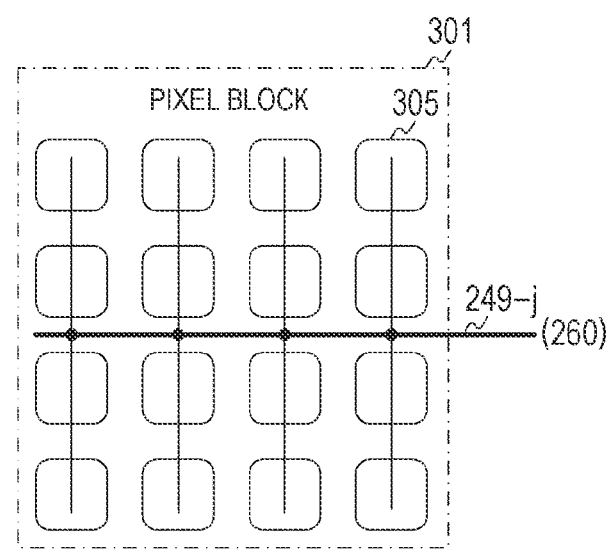

FIGS. 19A and 19B are plan view illustrating an example of the pixel block 301 arranged in four rows×four columns in the modification of the first embodiment of the present technology. FIG. 19A is an example of the pixel block 301 in which signal lines are wired in an H shape, and FIG. 19B in the figure is an example of the pixel block 301 in which signal lines are wired in a fish bone shape. In a case where the number of pixels is not reduced, as exemplified in the figure, wiring may be made in an H shape or wiring may be made in a fish bone shape.

Figure 20A:
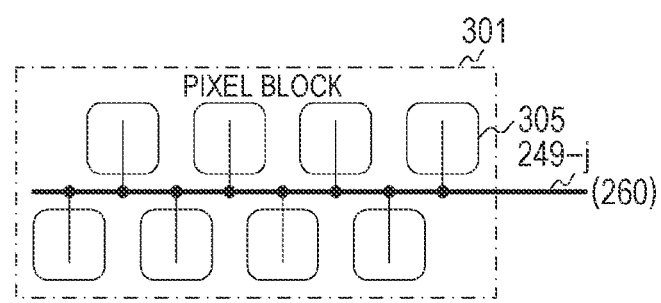
FIGS. 20A and 20B are plan view illustrating an example of the pixel block in a staggered arrangement in the modification of the first embodiment of the present technology.
Figure 20B:
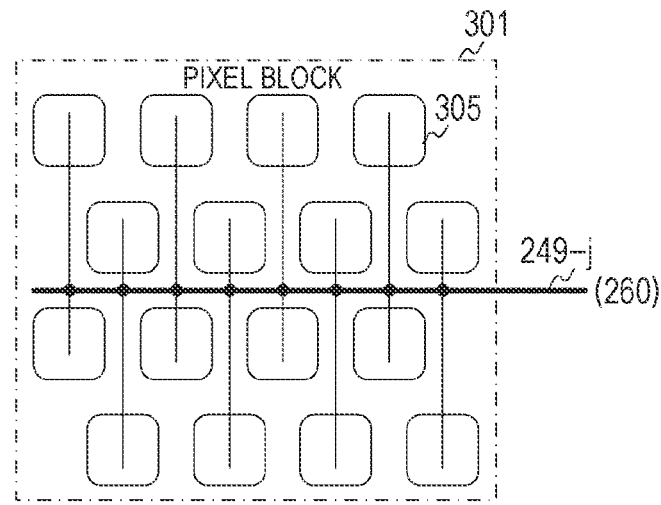

FIGS. 20A and 20B are plan view illustrating an example of the pixel block 301 in a staggered arrangement in the modification of the first embodiment of the present technology. FIG. 20A is an example of the pixel block 301 in which 8 pixels 305 are arranged in a staggered arrangement, and FIG. 20A is an example of the pixel block 301 in which 16 pixels 305 are arranged in a staggered arrangement. As exemplified in the figure, the pixels 305 can be arranged in a staggered arrangement.

Figure 21A:
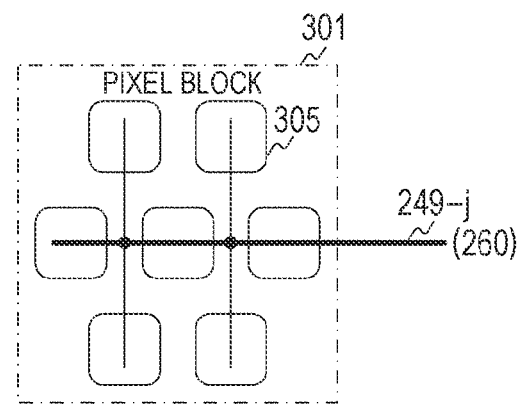
FIGS. 21A and 21B are plan view illustrating an example of the pixel block arranged in a hexagonal shape in the modification of the first embodiment of the present technology.
Figure 21B:
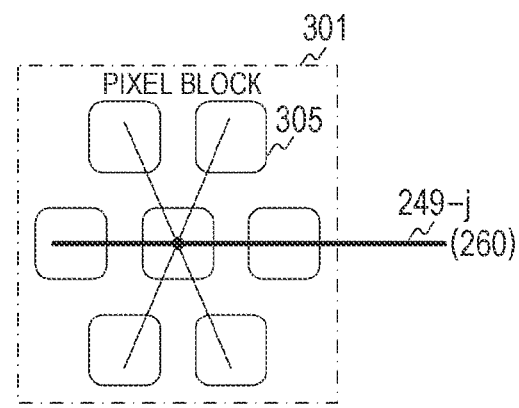

FIGS. 21A and 21B are plan view illustrating an example of the pixel block 301 arranged in a hexagonal shape in the modification of the first embodiment of the present technology. FIG. 21A is an example of the pixel block 301 in which, with one of seven pixels 305 as the center, remaining six pixels are arranged in a hexagonal shape and wired in a fish bone shape. FIG. 21B is an example of the pixel block 301 in which, with one of seven pixels 305 as the center, remaining six pixels are arranged in a hexagonal shape and are radially wired. As exemplified in the figure, the pixels 305 can be arranged in a hexagonal shape.

Figure 22A:
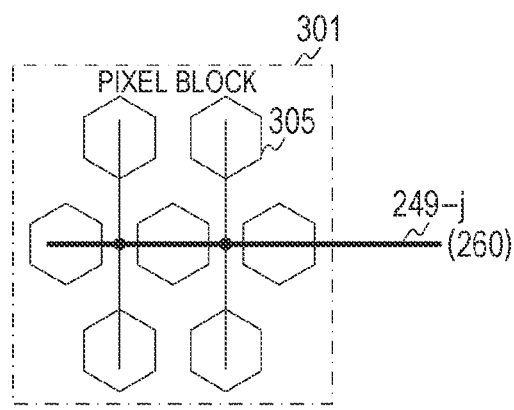
FIGS. 22A and 22B are plan view illustrating an example of the pixel block in which individual pixels are hexagonal in the modification of the first embodiment of the present technology.
Figure 22B:
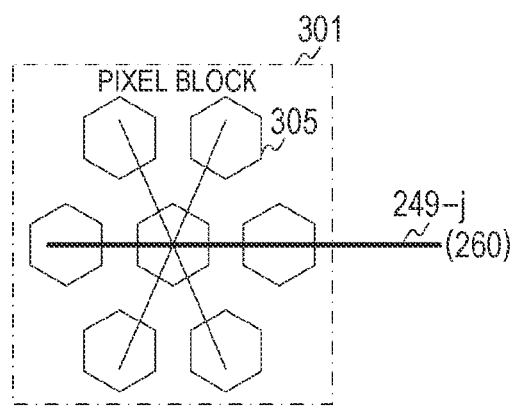

FIGS. 22A and 22B are plan view illustrating an example of the pixel block 301 in which individual pixels are hexagonal in the modification of the first embodiment of the present technology. FIG. 22A is an example of the pixel block 301 in which, with one of hexagonal seven pixels 305 as the center, remaining six pixels are arranged in a hexagonal shape and wired in a fish bone shape. FIG. 22B is an example of the pixel block 301 in which, with one of hexagonal seven pixels 305 as the center, remaining six pixels are arranged in a hexagonal shape and are radially wired. The pixel 305 may have a rectangular shape or a hexagonal shape as exemplified in the figure.

As described above, according to the modification of the first embodiment of the present technology, since the number of pixels in the pixel block 301 is reduced, resolution can be improved.

2. Second Embodiment

In the first embodiment described above, the analog-digital conversion unit 270 detects the number of simultaneous reactions; however, when a photon is newly incident during a period in which linearity is maintained between the number of photons and the level of the current signal, erroneous detection may occur. A solid-state imaging element 200 of a second embodiment is different from that of the first embodiment in that erroneous detection is suppressed by masking supply of a current signal over a mask period in which the linearity is maintained.

Figure 23:
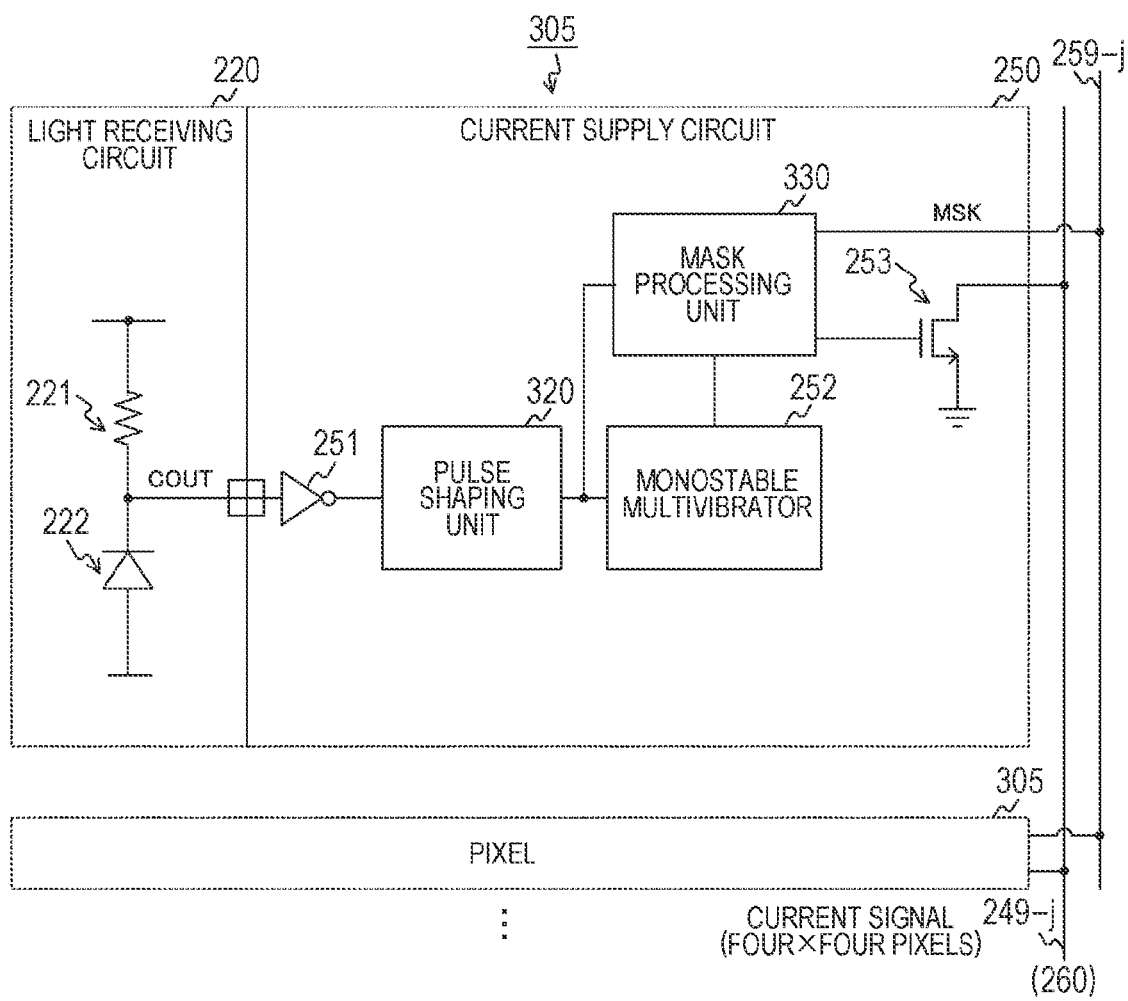
FIG. 23 is a circuit diagram illustrating a configuration example of a pixel in a second embodiment of the present technology.

FIG. 23 is a circuit diagram illustrating a configuration example of a pixel 305 in the second embodiment of the present technology. The pixel 305 is different from that of the first embodiment in that a pulse shaping unit 320 and a mask processing unit 330 are further provided in a current supply circuit 250. Furthermore, a signal line 259-$j$ is further wired for each pixel block 301, and each mask processing unit 330 in the pixel block 301 is connected in common to the signal line 259-$j$. A mask signal MSK is transmitted via the signal line 259-$j$.

Figure 24:
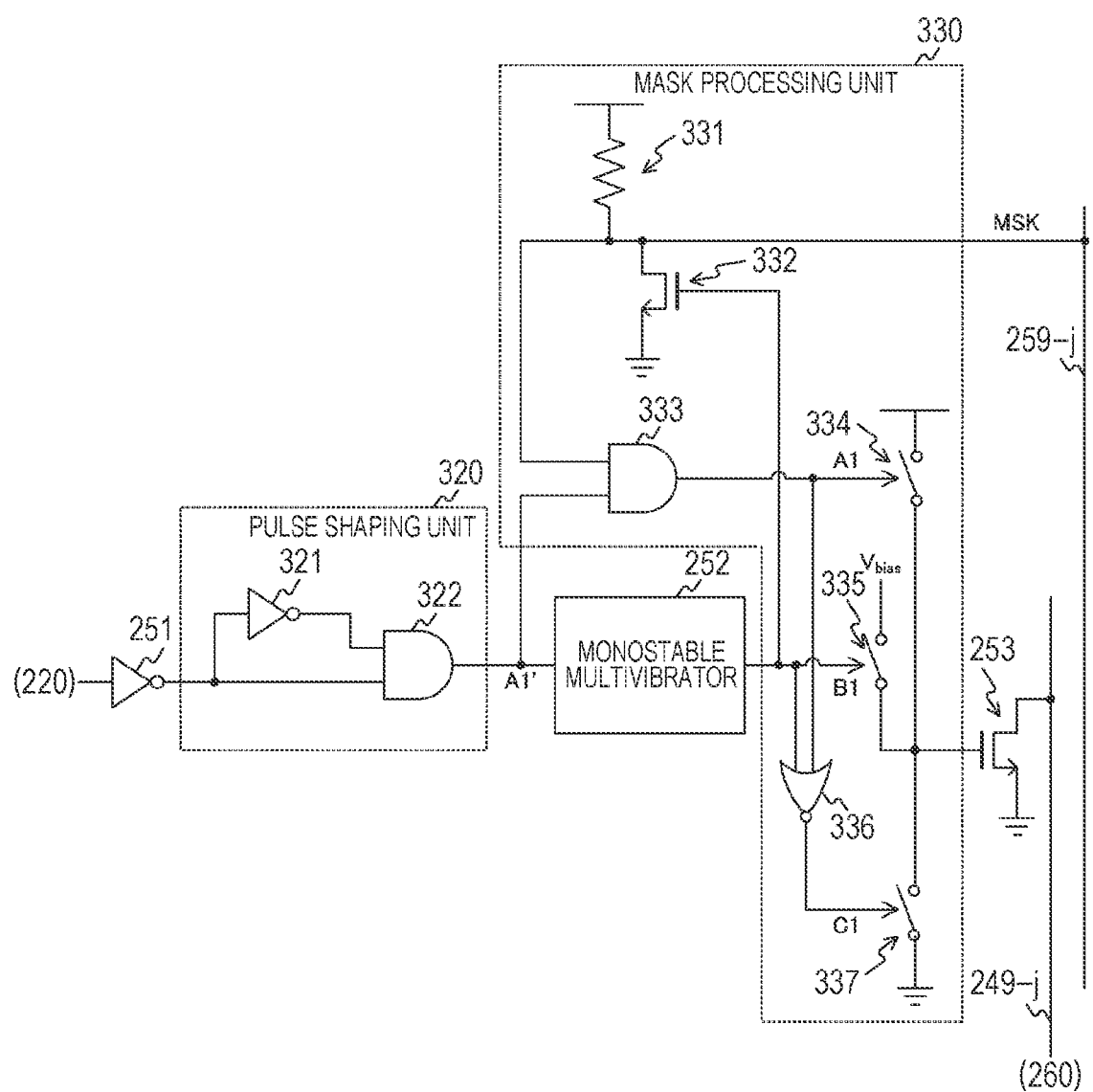
FIG. 24 is a circuit diagram illustrating a configuration example of a rise detection unit and a mask processing unit in the second embodiment of the present technology.

FIG. 24 is a circuit diagram illustrating a configuration example of a rise detection unit 320 and the mask processing unit 330 in the second embodiment of the present technology. The pulse shaping unit 320 includes an inverter 321 and an AND (logical product) gate 322. The mask processing unit 330 includes a resistor 331, an nMOS transistor 332, an AND gate 333, switches 334, 335, and 337, and a NOR (negative OR) gate 336. Note that, the number of inverters 321 in the pulse shaping unit 320 is not limited to one as long as it is an odd number.

The inverter 321 inverts an inverted signal from an inverter 251 and supplies a signal inverted to the AND gate 322. The AND gate 322 supplies a logical product of the inverted signal from the inverter 251 and the signal from the inverter 321 to the AND gate 333 and a monostable multivibrator 252 as a pulse signal A1'.

In the mask processing unit 330, the AND gate 333 outputs a logical product of the pulse signal A1' from the AND gate 322 and the mask signal MSK to the switch 334 and the NOR gate 336 as the pulse signal A1. Furthermore, the resistor 331 and the nMOS transistor 332 are connected in series between a power supply terminal and a ground terminal.

The monostable multivibrator 252 of the second embodiment supplies a pulse signal B1 to the gate of the nMOS transistor 332, the switch 335, and the NOR gate 336.

The switch 334 opens and closes a path between the power supply terminal and the switch 337 in accordance with the pulse signal A1. The switch 335 opens and closes a path between a terminal of a bias voltage $V_{bias}$ and a connection point between the switches 334 and 337 in accordance with the pulse signal B1. The connection point is connected to the gate of a transistor 253. The NOR gate 336 supplies a control signal C1 as a negative OR of the pulse signal A1 and the pulse signal B1 to the switch 337. The switch 337 opens and closes a path between the switch 334 and the ground terminal in accordance with the control signal C1.

With a circuit configuration exemplified in the figure, the pulse shaping unit 320 generates the pulse signal A1 having a pulse width shorter than a pulse signal generated by the monostable multivibrator 252 at the subsequent stage on the basis of the inverted signal from the inverter 251. The pulse width of the pulse signal A1 is adjusted by the number of inverters 321. Note that, the pulse shaping unit 320 is an example of a first pulse signal generation unit in the claims. Furthermore, the mask processing unit 330 supplies the mask signal MSK of the low level to the signal line 259-$j$ over a certain mask period after the pulse signal A1 is generated and falls. The mask period corresponds to a period during which the pulse signal B1 and the like are at the high level. During the mask period, even if the pulse signal A1 is newly generated, the mask processing unit 330 maintains the transistor 253 in the OFF state and masks output of the current signal. Note that, the circuit of the pulse shaping unit 320 is not limited to the circuit exemplified in the figure as long as it can generate a pulse signal having a pulse width shorter than that of the monostable multivibrator 252 at the subsequent stage. For example, a monostable multivibrator can also be arranged in the pulse shaping unit 320.

Note that, the resistor 331 and the nMOS transistor 332 are arranged for each pixel 305, but the present invention is not limited to this configuration. It is also possible to have a configuration in which one each of the resistor 331 and the nMOS transistor 332 are arranged in the pixel block 301 and shared by all the pixels in the pixel block 301.

Figure 25:
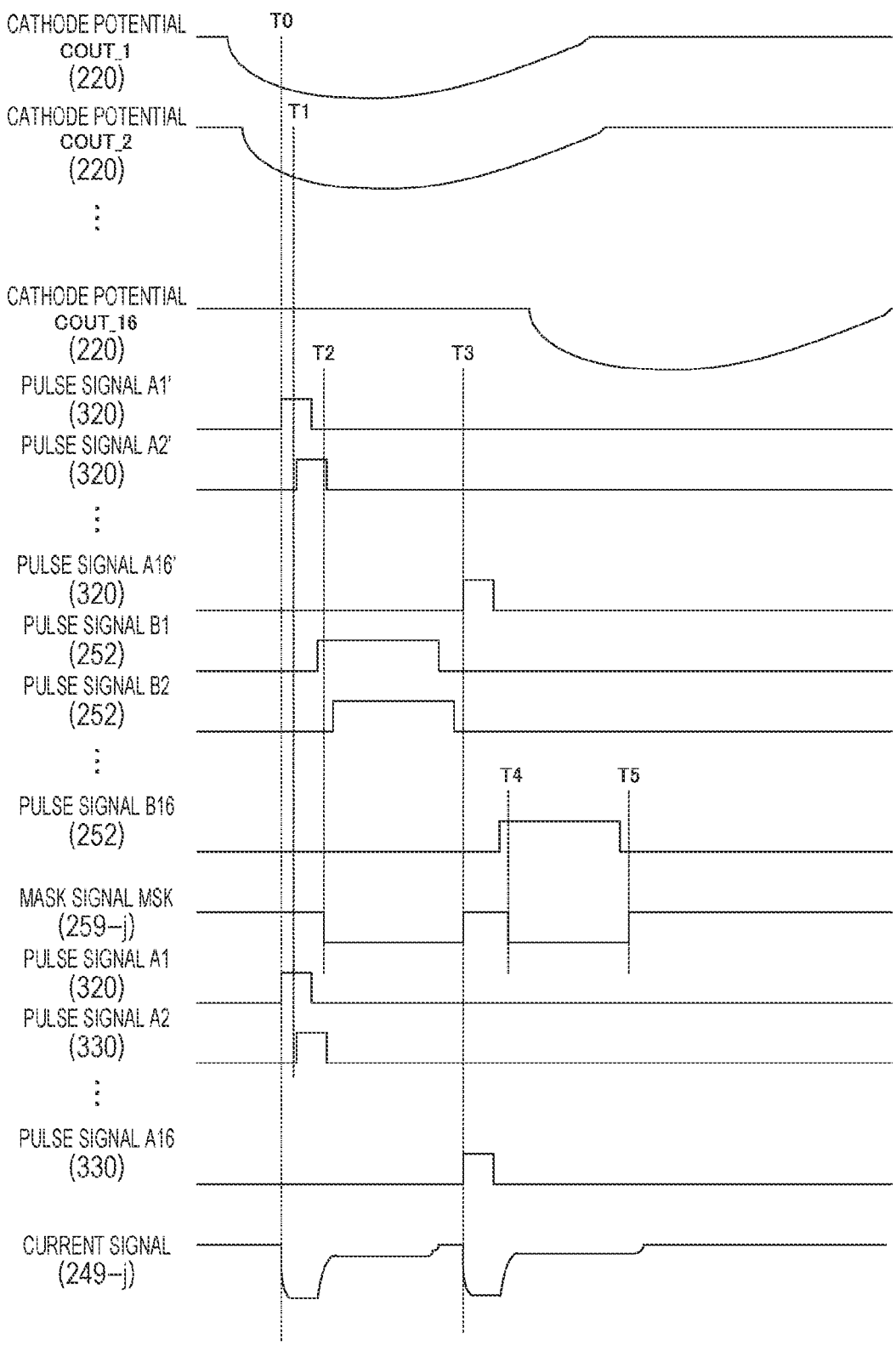
FIG. 25 is a timing chart illustrating an example of operation of a solid-state imaging element in the second embodiment of the present technology.

FIG. 25 is a timing chart illustrating an example of operation of the solid-state imaging element 200 in the second embodiment of the present technology.

It is assumed that the cathode potential COUT_1 decreases depending on incidence of a photon immediately before timing T0, and the cathode potential COUT_2 decreases depending on incidence of a photon immediately before timing T1. In this case, the rise of the inverted signal is detected at the timing T0, and the pulse signal A1' is generated. Furthermore, a pulse signal A2' is generated at the timing T1. After the pulse signal A2' falls, the mask signal MSK is controlled to the low level over the mask period from timing T2 to timing T3. The mask period corresponds to a period during which any of the pulse signals B1 and B2 is at the high level. It is assumed that there is no incidence of a new photon within this pulse period.

Furthermore, the pulse signals A1 and A2 are generated at the timings T0 and T1, thereby transmitting a current signal. The number of simultaneous reactions is detected on the basis of the current signal.

Then, when a pulse signal A16' is generated at timing T3 when the mask period has elapsed, the mask signal MSK is controlled to the low level over the mask period from timing T4 to timing T5.

As exemplified in the figure, in a case where there is no incidence of the new photon within the mask period, the current signal is not masked, and the number of simultaneous reactions is detected from the current signal as in the first embodiment.

Figure 26:
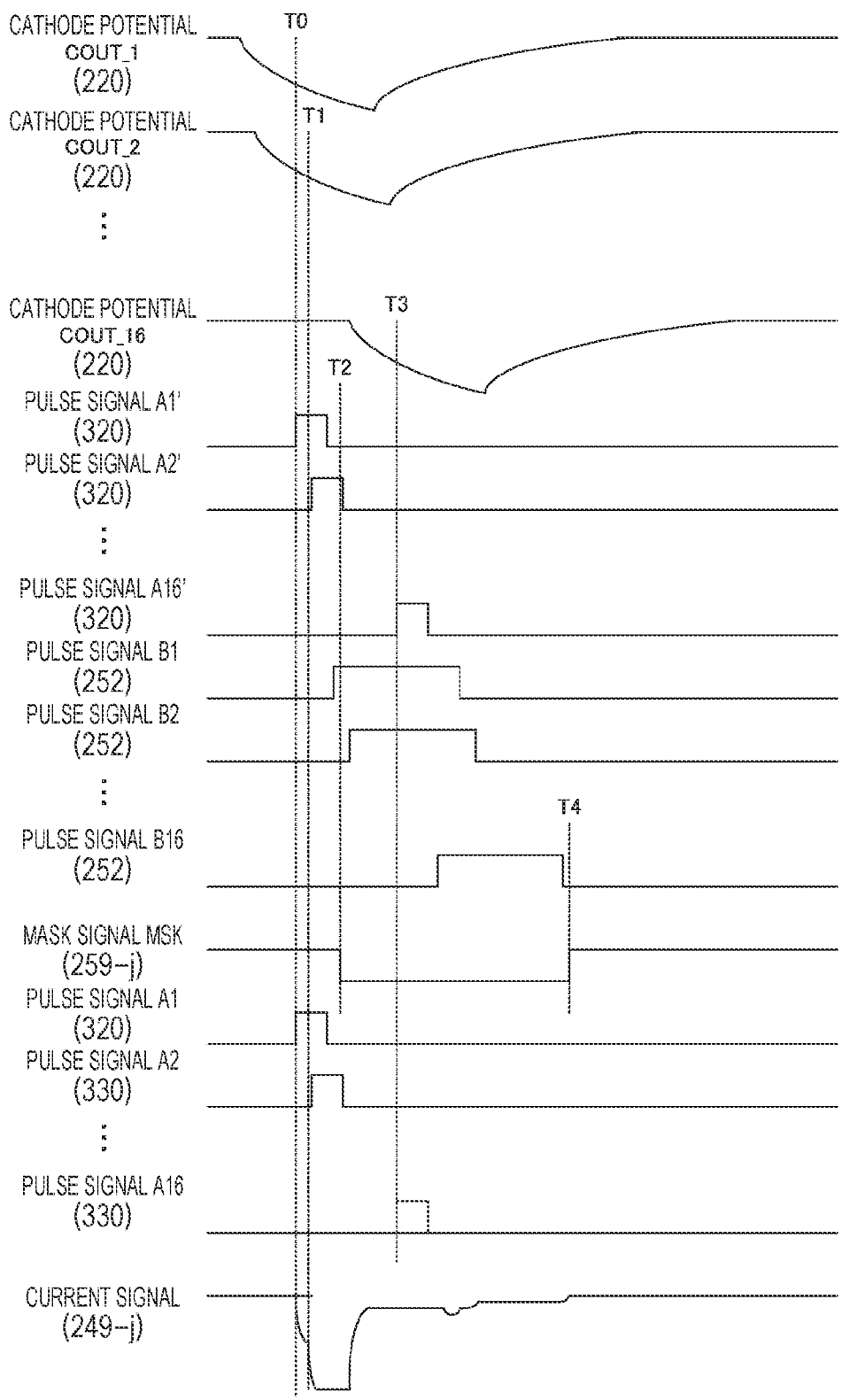
FIG. 26 is a timing chart illustrating an example of operation of the solid-state imaging element when a current signal is masked in the second embodiment of the present technology.

FIG. 26 is a timing chart illustrating an example of operation of the solid-state imaging element when a current signal is masked in the second embodiment of the present technology.

It is assumed that the cathode potential COUT_1 decreases depending on incidence of a photon immediately before timing T0, and the cathode potential COUT_2 decreases depending on incidence of a photon immediately before timing T1. It is assumed that the cathode potential COUT_16 decreases depending on incidence of a photon immediately before later timing T3. In this case, the rise of the inverted signal is detected at the timing T0, and the pulse signal A1' is generated. Furthermore, the pulse signal A2' is generated at the timing T1, and a pulse signal A3' is generated at the timing T3.

Furthermore, after the detection signal A2' falls, the mask signal MSK is controlled to the low level over the mask period from the timing T2 to timing 14. The mask period corresponds to a period during which any of the pulse signals B1, B2, and B16 is at the high level.

In the figure, light is incident during the mask period, and the pulse signal A16' is generated. In this case, the mask processing unit 330 causes a corresponding pulse signal A16 to disappear in accordance with the mask signal MSK of the low level. As a result, the output of the current signal corresponding to the pulse signal A16 is masked.

Furthermore, the pulse signals A1 and A2 are generated at the timings T0 and T1, thereby transmitting a current signal. The number of simultaneous reactions is detected on the basis of the current signal. Here, in a period from the rise to fall of the pulse signal A1, linearity is not maintained between the number of photons incident substantially simultaneously and the level of the current signal, but the linearity is maintained after the period elapses. For this reason, in the first embodiment in which the current signal is not masked, when a new photon is incident in a period in which the linearity is maintained, there is a possibility that an erroneous number of simultaneous reactions is detected due to fluctuation of the current signal depending on the new photon. On the other hand, in the second embodiment, as exemplified in the figure, since a new current signal is masked over the mask period in which the linearity is maintained, the number of simultaneous reactions can be accurately detected.

Figure 27:
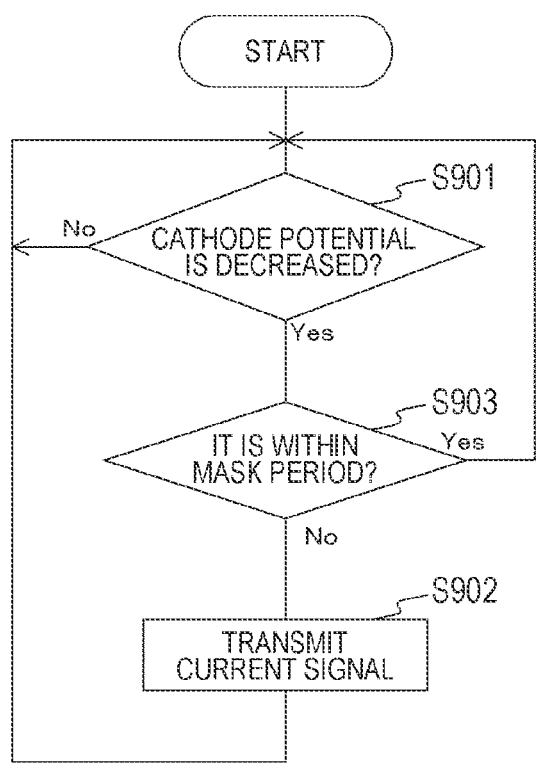
FIG. 27 is a flowchart illustrating an example of operation of a pixel in the second embodiment of the present technology.

FIG. 27 is a flowchart illustrating an example of operation of the pixel 305 in the second embodiment of the present technology. The pixel 305 of the second embodiment is different from that of the first embodiment in that step S903 is further executed. In a case where the cathode potential decreases (step S901: Yes), the pixel 305 refers to the mask signal MSK and determines whether or not it is within the mask period (step S903).

In a case where it is not within the mask period (step S903: No), the pixel 305 generates a current signal and transmits the current signal via a signal line (step S902). In a case where it is within the mask period (step S903: Yes), or after step S902, the pixel 305 repeatedly executes step S901 and the subsequent steps.

As described above, according to the second embodiment of the present technology, since the mask processing unit 330 masks the new current signal over the mask period in which the linearity is maintained between the number of photons and the level of the current signal, it is possible to suppress erroneous detection of the number of simultaneous reactions.

3. Third Embodiment

In the second embodiment described above, the mask processing unit 330 masks the current signal over the mask period, but the current signal is not masked within a pulse period of the pulse signal B16 corresponding to the pulse signal B16 after the pulse signal B2. For this reason, the level of the signal line 249-$j$ may fluctuate within the period. A solid-state imaging element 200 of a third embodiment is different from that of the second embodiment in that an influence of the fluctuation of the current signal in an unmasked period is suppressed by providing a sample hold circuit.

Figure 28:
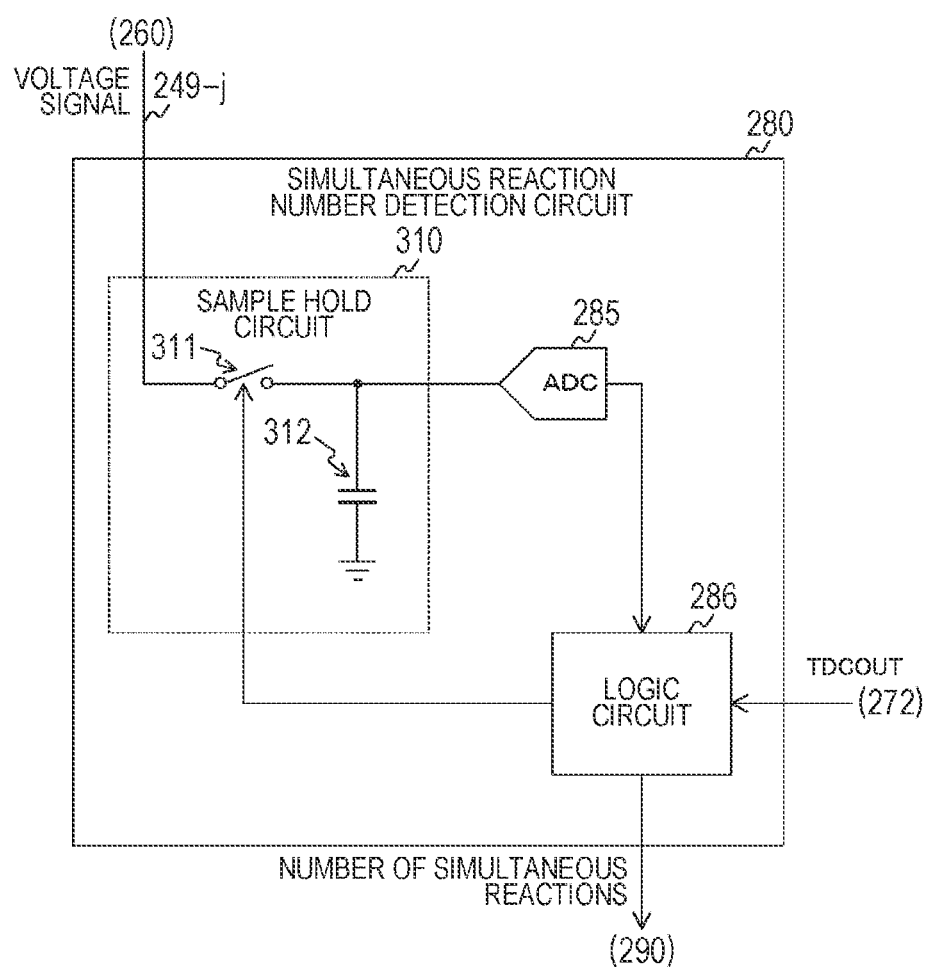
FIG. 28 is a circuit diagram illustrating a configuration example of a simultaneous reaction number detection circuit in a third embodiment of the present technology.

FIG. 28 is a circuit diagram illustrating a configuration example of a simultaneous reaction number detection circuit 280 in the third embodiment of the present technology. The simultaneous reaction number detection circuit 280 of the third embodiment is different from that of the second embodiment in that a sample hold circuit 310 is provided instead of the peak hold circuit 281.

The sample hold circuit 310 takes in a voltage signal from a current-voltage conversion unit 260 at a predetermined timing and holds the voltage signal as a hold value. The sample hold circuit 310 includes a sample switch 311 and a capacitor 312.

The sample switch 311 opens and closes a path between a signal line 249-j and an ADC 285 in accordance with control of a logic circuit 286. The capacitor 312 is inserted between a path between the sample switch 311 and the ADC 285 and a ground terminal. Note that, a circuit configuration of the sample hold circuit 310 is not limited to that exemplified in the figure. For example, a circuit that performs bottom plate sampling may be provided.

The logic circuit 286 detects the number of simultaneous reactions on the basis of the hold value. Furthermore, for example, when a digital value TDCOUT from a time digital converter 272 is a predetermined value (for example, "1"), the logic circuit 286 controls the sample switch 311 to cause a voltage signal to be taken in (that is, to be sampled). As a result, since the voltage signal in the subsequent pulse period of the pulse signal B16 is not sampled, even if the current signal fluctuates in the pulse period, the hold value does not fluctuate. As a result, it is possible to suppress erroneous detection due to fluctuation of the current signal.

As described above, in the third embodiment of the present technology, since the sample hold circuit 310 takes in and holds the voltage signal at a predetermined timing, the hold value does not fluctuate even if the current signal fluctuates thereafter. As a result, it is possible to suppress erroneous detection due to fluctuation of the current signal.

4. Fourth Embodiment

In the first embodiment described above, the current signal is transmitted through one signal line 249-j for each pixel block 301, but as the signal line becomes longer, wiring resistance increases, and a signal level may decrease. A solid-state imaging element 200 of a fourth embodiment is different from that of the first embodiment in that a pair of differential signals obtained by differentially amplifying a pulse signal and an inverted signal thereof is transmitted.

Figure 29:
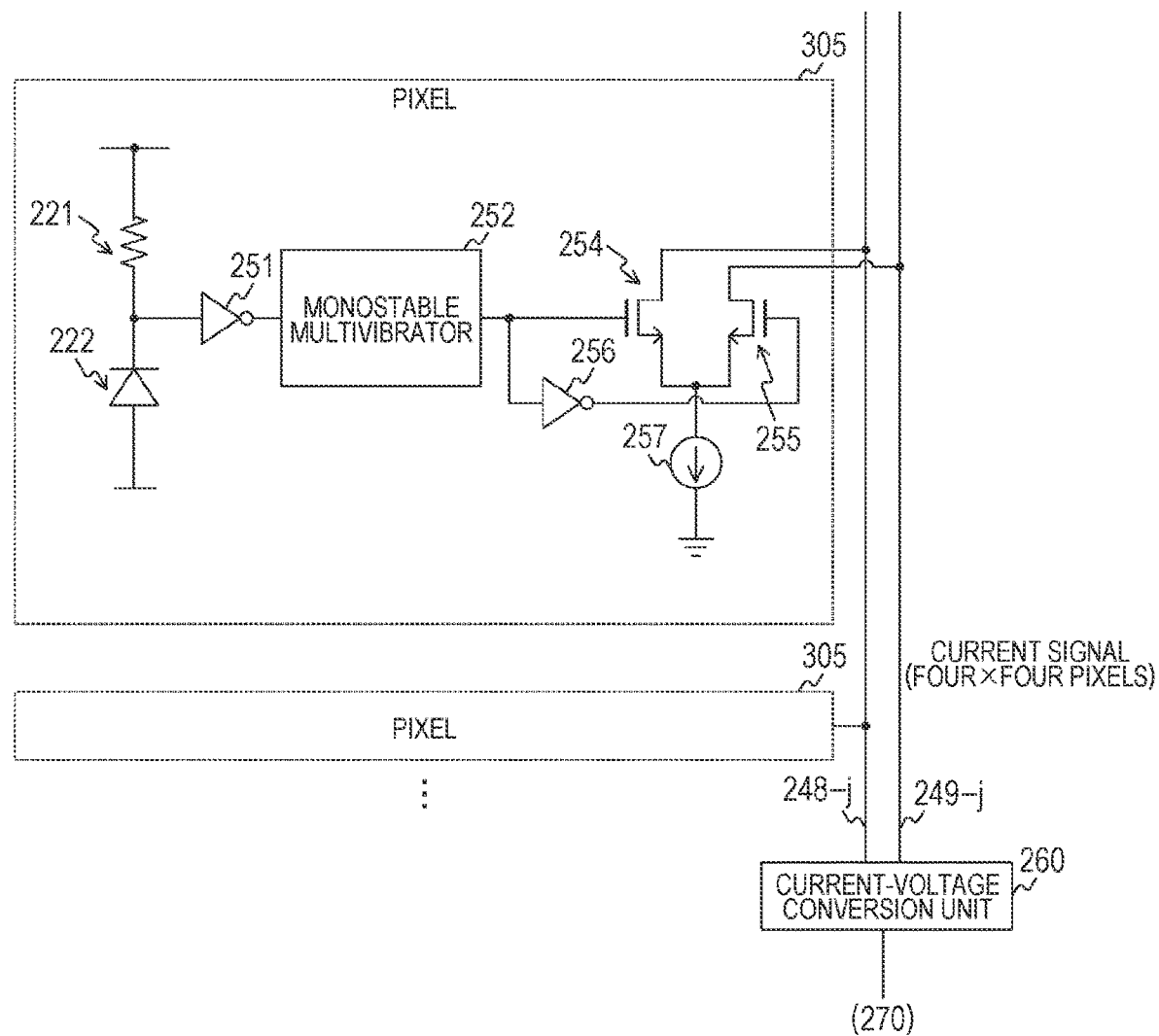
FIG. 29 is a circuit diagram illustrating a configuration example of a pixel in a fourth embodiment of the present technology.

FIG. 29 is a circuit diagram illustrating a configuration example of a pixel 305 in the fourth embodiment of the present technology. The pixel 305 of the fifth embodiment is different from that of the first embodiment in including an inverter 256, differential transistors 254 and 255, and a current source 257 instead of the transistor 253.

Furthermore, in the fourth embodiment, a signal line 248-j is further wired in addition to the signal line 249-j for each pixel block 301. A plurality of the pixels 305 in the pixel block 301 is connected in common to these pair of signal lines.

A monostable multivibrator 252 of the fourth embodiment supplies a pulse signal to the gate of the differential transistor 254 and the inverter 256. The inverter 256 inverts the pulse signal and supplies an inverted pulse signal to the gate of the differential transistor 255.

The differential transistor 254 is inserted between the signal line 248-j and the current source 257, and the differential transistor 255 is inserted between the signal line 249-j and the current source 257. The current source 257 supplies a constant current.

A circuit including the differential transistors 254 and 255 and the current source 257 functions as a differential amplification circuit that differentially amplifies the pulse signal and the inverted signal thereof. Then, a pair of differential signals are supplied as current signals to a current-voltage conversion unit 260 via the signal lines 248-j and 249-j. As described above, by transmitting the pair of differentially amplified differential signals, it is possible to suppress a decrease in a signal level due to an increase in wiring resistance as compared with a case where the differential signals are transmitted without being differentially amplified.

Note that, the third embodiment can also be applied to the fourth embodiment.

As described above, according to the fourth embodiment of the present technology, since the pixel 305 transmits the pair of differentially amplified differential signals, it is possible to suppress the decrease in the signal level due to the increase in the wiring resistance as compared with a case where differential amplification is not performed.

5. Fifth Embodiment

In the first embodiment described above, each of the pixels 305 transmits a current signal as an analog signal, but a voltage signal can be transmitted instead. A solid-state imaging element 200 of a fifth embodiment is different from that of the first embodiment in that a voltage signal is transmitted.

Figure 30:
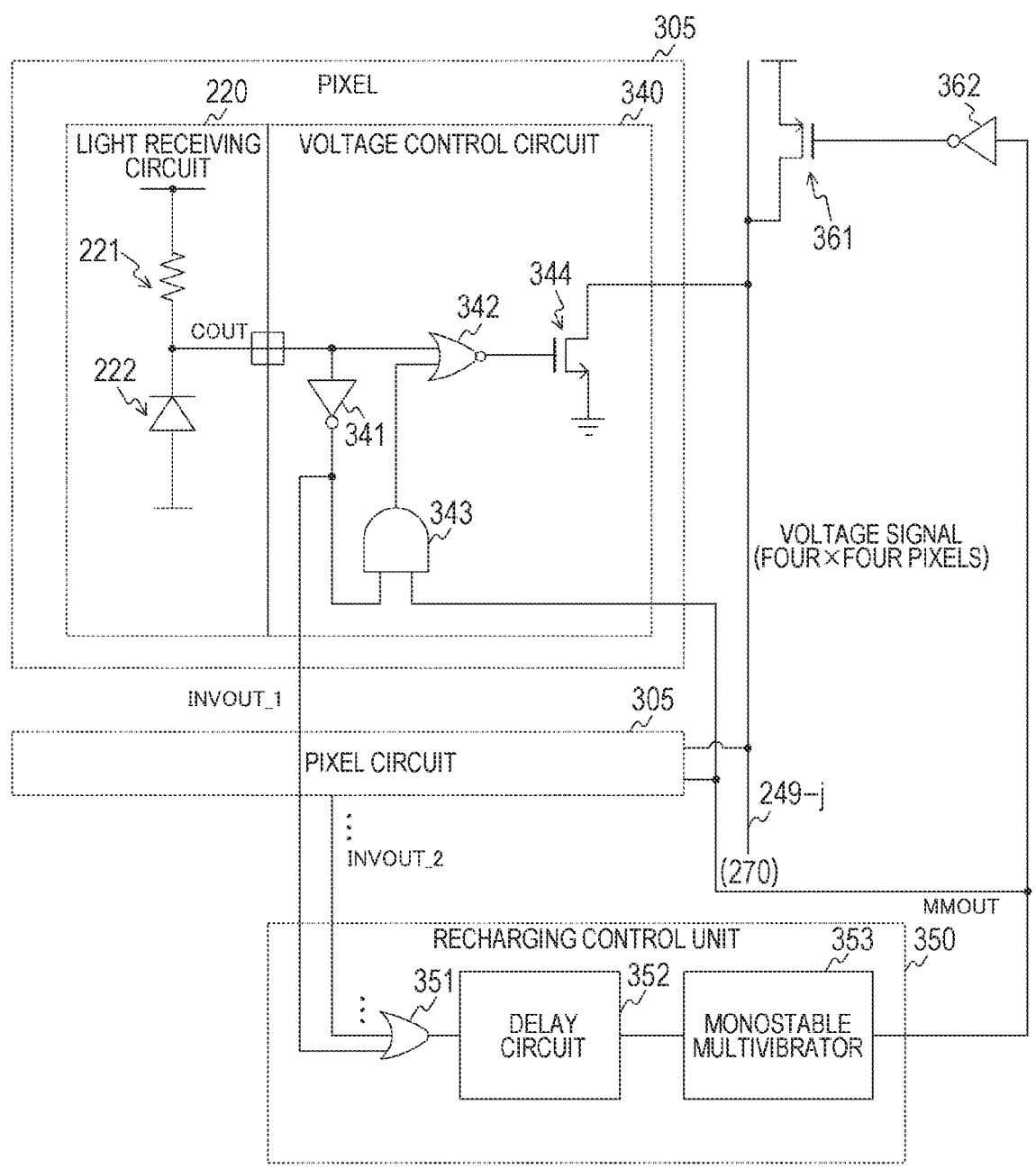
FIG. 30 is a circuit diagram illustrating a configuration example of a pixel array unit in a fifth embodiment of the present technology.

FIG. 30 is a circuit diagram illustrating a configuration example of a pixel array unit 300 in the fifth embodiment of the present technology. In the pixel array unit 300 of the fifth embodiment, an nMOS transistor 361, an inverter 362, and a recharging control unit 350 are provided for each pixel block 301. Furthermore, in each of the pixels 305, a voltage control circuit 340 is arranged instead of the current signal supply circuit 250.

In the voltage control circuit 340, an inverter 341, a NOR gate 342, an AND gate 343, and an NMOS transistor 344 are arranged. Furthermore, an OR gate 351, a delay circuit 352, and a monostable multivibrator 353 are arranged in the recharging control unit 350.

The inverter 341 inverts a signal of a cathode potential COUT and supplies an inverted signal INVOUT_1 to the OR gate 351 and the AND gate 343. The AND gate 343 outputs a logical product of the inverted signal from the inverter 341 and a pulse signal MMOUT from the monostable multivibrator 353 to the NOR gate 342. The NOR gate 342 supplies a negative OR of the signal of the cathode potential COUT and a signal from the AND gate 343 to the gate of the nMOS transistor 344. The nMOS transistor 344 is inserted between a signal line 249-j and a ground terminal.

In the recharging control unit 350, the OR gate 351 supplies a logical sum of inverted signals INVOUT_1 to INVOUT_16 from the respective pixels 305 in the pixel block 301 to the delay circuit 352. The delay circuit 352 delays a signal from the OR gate 351 and supplies a delayed signal to the monostable multivibrator 353. The monostable multivibrator 353 generates a pulse signal MMOUT depending on a delayed signal from the delay circuit 352 and outputs the pulse signal MMOUT to the inverter 362 and the AND gate 343 of each pixel 305.

The inverter 362 inverts the pulse signal MMOUT and outputs an inverted signal to the gate of the nMOS transistor 361. The nMOS transistor 361 is inserted between a power supply terminal and the signal line 249-j.

Furthermore, in the fifth embodiment, a current-voltage conversion unit 260 is not arranged, and the signal line 249-j is connected to an analog-digital conversion unit 270 without passing through the current-voltage conversion unit 260.

With the configuration exemplified in the figure, the recharging control unit 350 detects the earliest rise among the inverted signals INVOUT_1 to INVOUT_16, and delays a result of the detection to generate the pulse signal MMOUT.

Furthermore, the recharging control unit 350 turns on the nMOS transistor 361 on the power supply side within a pulse period of the pulse signal MMOUT and turns off the nMOS transistor outside the pulse period to recharge the signal line 249-j (that is, a bus). By these controls, as the number of simultaneous reactions increases, a voltage signal whose level rapidly changes is generated as an analog signal and transmitted via the signal line 249-j.

Figure 31:
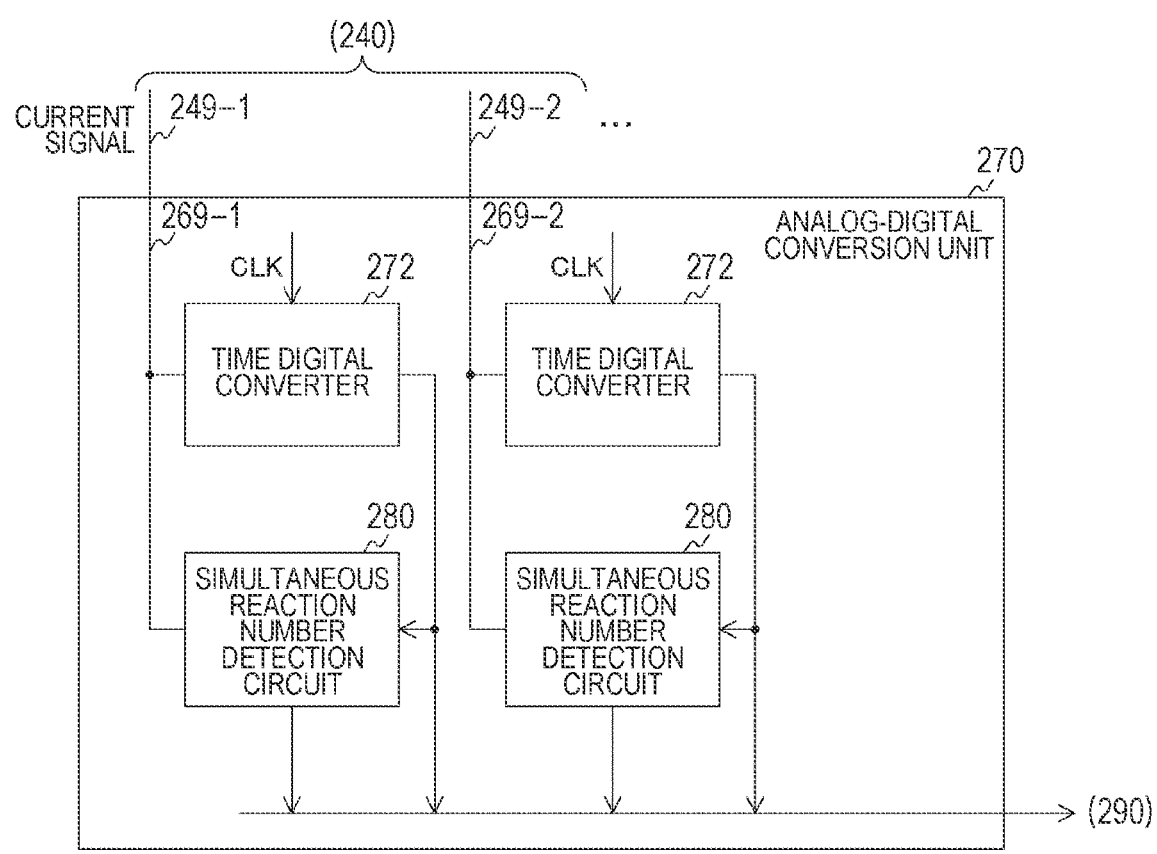
FIG. 31 is a block diagram illustrating a configuration example of an analog-digital conversion unit in the fifth embodiment of the present technology.

FIG. 31 is a block diagram illustrating a configuration example of the analog-digital conversion unit 270 in the fifth embodiment of the present technology. The analog-digital conversion unit 270 of the fifth embodiment is different from that of the first embodiment in that a zero current confirmation circuit 271 is not arranged in each column.

Furthermore, a time digital converter 272 converts a timing (fall, fall, or the like) synchronized with a clock signal CLK, that is, an elapsed time from a light emission timing into a digital value.

Figure 32:
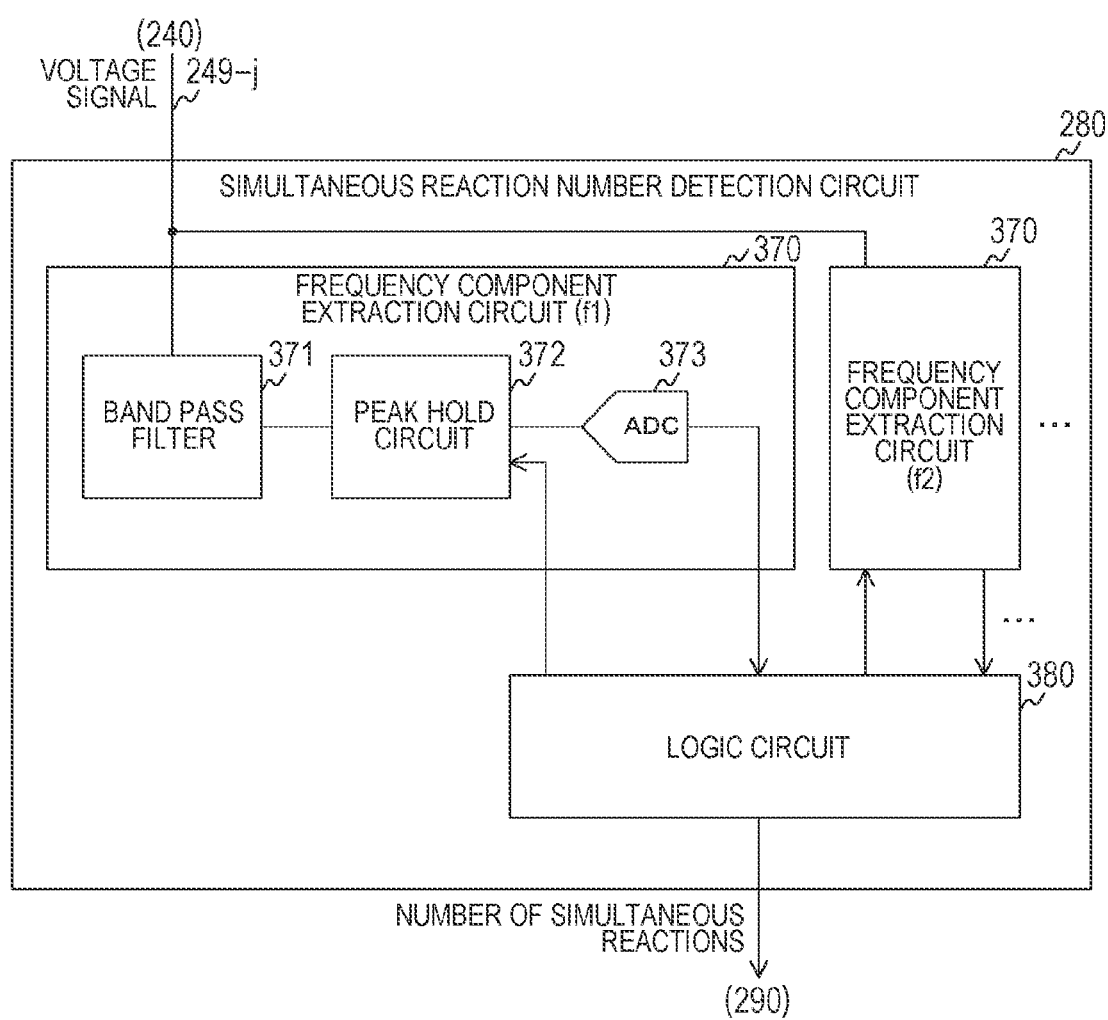
FIG. 32 is a block diagram illustrating a configuration example of a simultaneous reaction number detection unit in the fifth embodiment of the present technology.

FIG. 32 is a block diagram illustrating a configuration example of a simultaneous reaction number detection circuit 280 in the fifth embodiment of the present technology. The simultaneous reaction number detection circuit 280 of the fifth embodiment includes a plurality of frequency component extraction circuits 370 that extracts frequency components different from each other, and a logic circuit 380. Furthermore, each of the frequency component extraction circuits 370 includes a band pass filter 371, a peak hold circuit 372, and an ADC 373.

The band pass filter 371 causes a corresponding frequency component in a voltage signal to pass, and supplies the frequency component to the peak hold circuit 372. Configurations of the peak hold circuit 372 and the ADC 373 are similar to those of the peak hold circuit 281 and the ADC 285 of the first embodiment.

The logic circuit 380 detects the number of simultaneous reactions on the basis of a frequency characteristic of the voltage signal. For example, when a low frequency component having a frequency lower than a predetermined value and a high frequency component having a frequency higher than the predetermined value are extracted, the higher the level of the high frequency component with respect to the low frequency component, the larger the number of simultaneous reactions detected. Furthermore, the logic circuit 380 initializes the peak hold circuit 372 when the digital value from the time digital converter 272 is a predetermined value.

Figure 33:
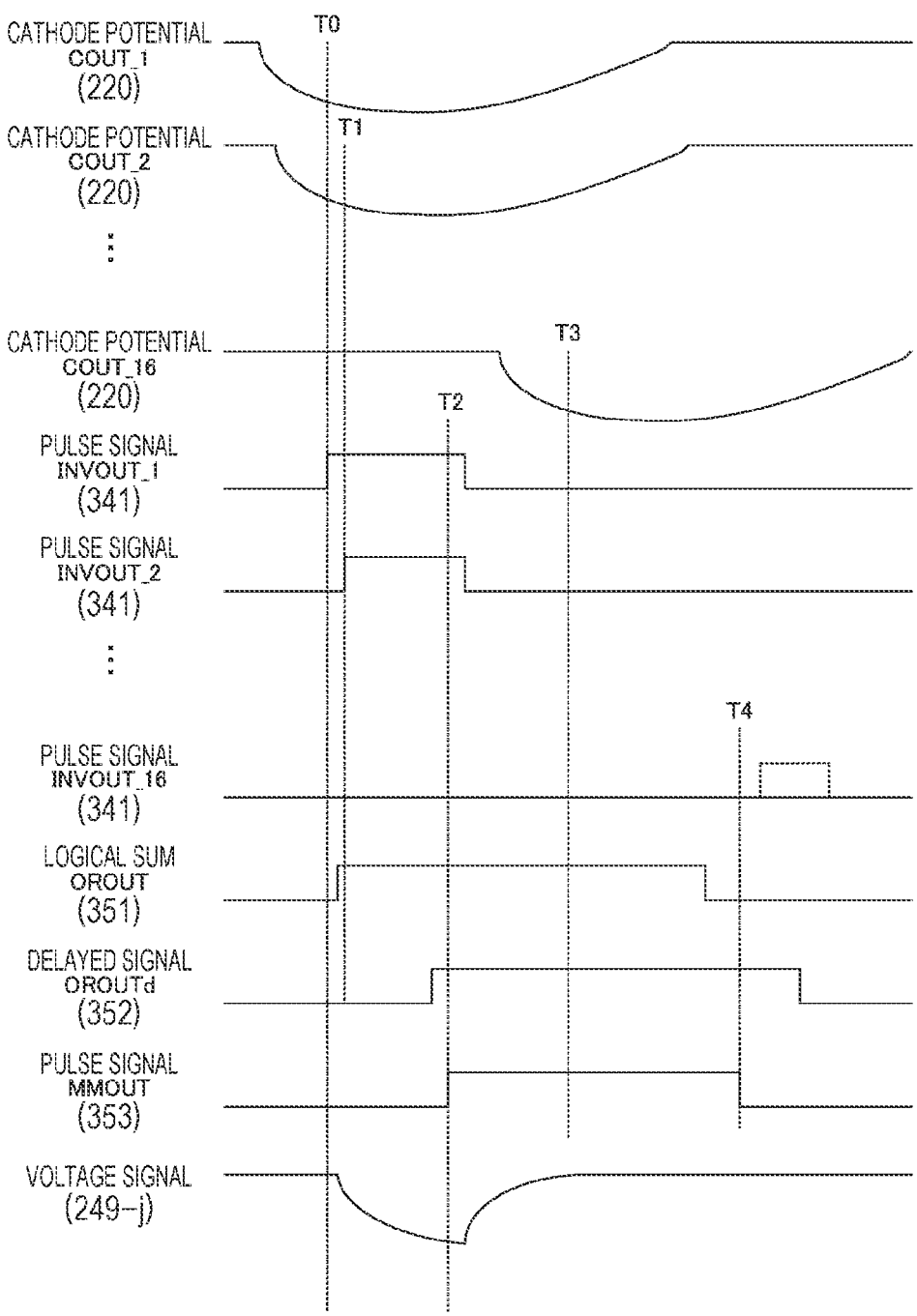
FIG. 33 is a timing chart illustrating an example of operation of a solid-state imaging element in the fifth embodiment of the present technology.

FIG. 33 is a timing chart illustrating an example of operation of the solid-state imaging element in the fifth embodiment of the present technology.

It is assumed that the cathode potential COUT_1 decreases depending on incidence of a photon immediately before timing T0, and the cathode potential COUT_2 decreases depending on incidence of a photon immediately before timing T1. Furthermore, immediately before timing T3, it is assumed that the cathode potential COUT_16 decreases depending on incidence of a photon. In this case, the inverted signal INVOUT_1 is generated at the timing T0, and the inverted signal INVOUT_2 is generated at the timing T1.

Then, immediately after the timing T0, output of a logical sum OROUT of the high level is started by the OR gate 351. Then, the pulse signal MMOUT having a pulse width of from timing T2 to timing 14 is output depending on a delayed signal OROUTd obtained by delaying the logical sum OROUT.

Furthermore, immediately after the timing T0, a voltage signal having a frequency characteristic corresponding to the number of simultaneous reactions is output via the signal line 249-j. The signal line 249-j is recharged by an inverted signal of the pulse signal MMOUT after the timing T2. Furthermore, the pulse signal MMUOT of the high level is input to the AND gate 343, whereby generation of the inverted signal INVOUT_16 corresponding to a photon that is not incident substantially simultaneously is suppressed.

Figure 34:
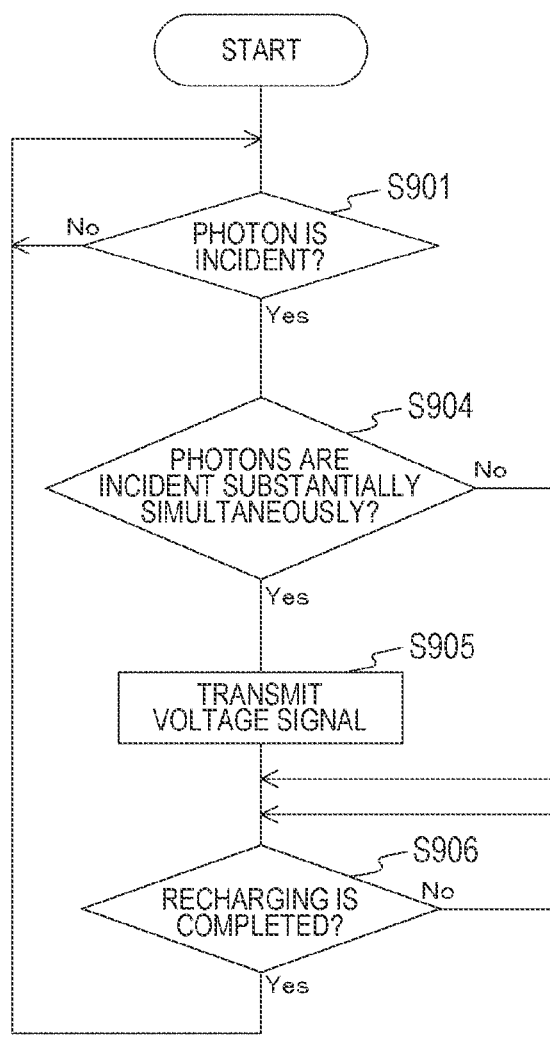
FIG. 34 is a flowchart illustrating an example of operation of a pixel in the fifth embodiment of the present technology.

FIG. 34 is a flowchart illustrating an example of operation of the pixel 305 in the fifth embodiment of the present technology. First, the pixel 305 determines whether or not the cathode potential of the photoelectric conversion element 222 is decreased (in other words, a photon is incident) (step S901). In a case where the cathode potential decreases (step S901: Yes), the pixel 305 determines whether or not a photon of the pixel is incident substantially simultaneously with a photon of another pixel (step S904). This determination is performed by the AND gate 343. The fact that output of the AND gate 343 is at the high level indicates that photons are not incident substantially simultaneously.

In a case where photons are incident substantially simultaneously (step S904: Yes), the pixel 305 generates a voltage signal and transmits the voltage signal via a signal line (step S905). Then, the pixel 305 determines whether or not recharging of the signal line 249-j is completed (step S906). In a case where photons are not incident substantially simultaneously (step S904: No), a voltage signal is not output from the pixel 305, and step S906 is executed.

In a case where the recharging is not completed (step S906: No), the pixel 305 repeats step S906. In a case where the recharging is completed (step S906: Yes), the pixel 305 repeatedly executes step S901 and the subsequent steps.

As described above, in the fifth embodiment of the present technology, since the pixel 305 generates a voltage signal depending on incidence of light and transmits the voltage signal, the current-voltage conversion unit 260 and the zero current confirmation circuit 271 become unnecessary.

6. Sixth Embodiment

In the above-described fifth embodiment, the simultaneous reaction number detection circuit 280 is provided with the band pass filter 371 and the peak hold circuit 372 for each frequency component to extract the frequency component. However, in this configuration, as the number of frequency components to be extracted increases, the number of the band pass filters 371 and the like increases, and circuit scale of the simultaneous reaction number detection circuit 280 increases. A solid-state imaging element 200 of a sixth embodiment is different from that of the fifth embodiment in that the circuit scale of the simultaneous reaction number detection circuit 280 is reduced by detecting the number of simultaneous reactions on the basis of a slew rate.

Figure 35:
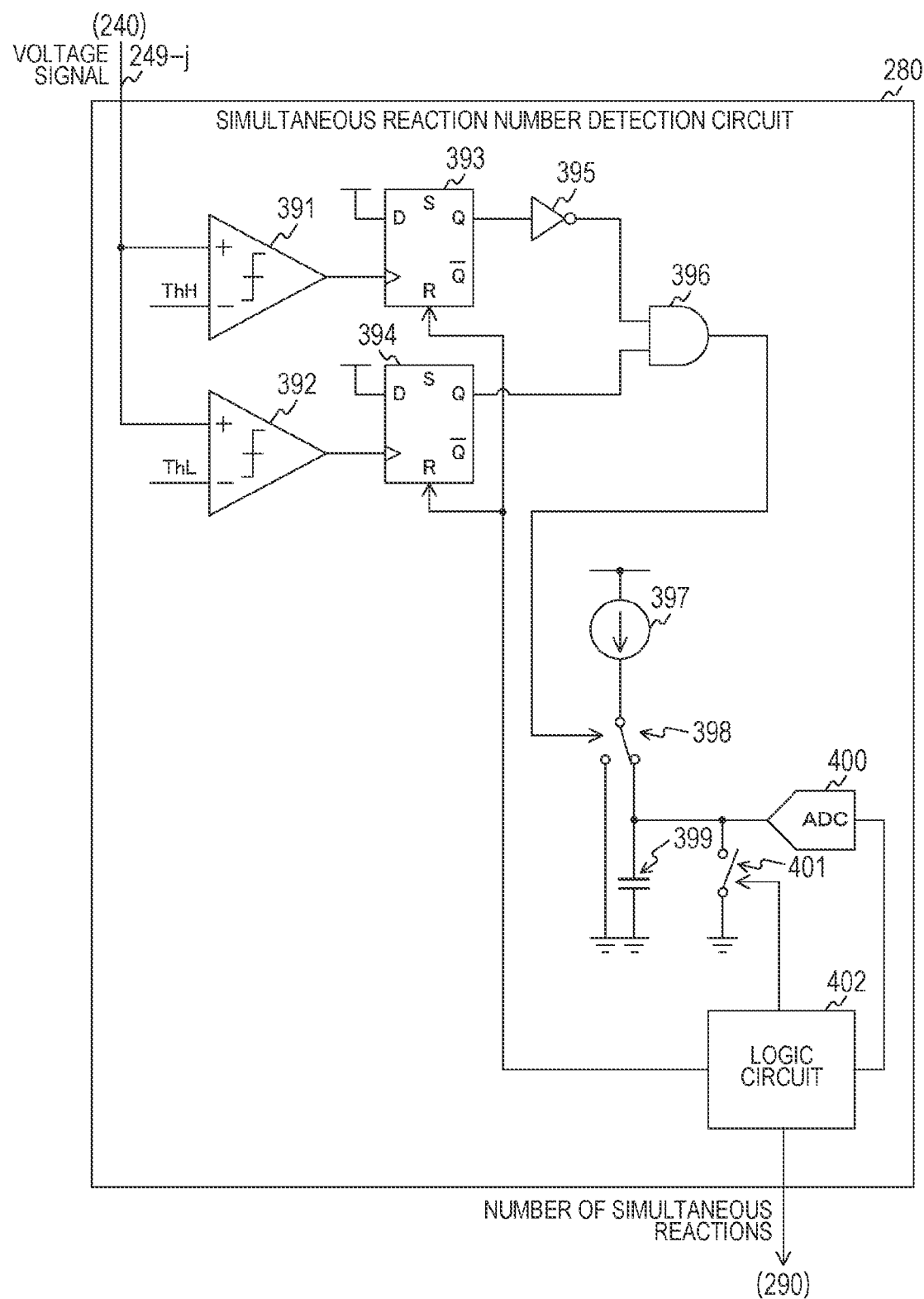
FIG. 35 is a block diagram illustrating a configuration example of a simultaneous reaction number detection circuit in a sixth embodiment of the present technology.

FIG. 35 is a block diagram illustrating a configuration example of the simultaneous reaction number detection circuit 280 in the sixth embodiment of the present technology. The simultaneous reaction number detection circuit 280 of the sixth embodiment includes comparators 391 and 392, latch circuits 393 and 394, an inverter 395, and an AND gate 396. Furthermore, the simultaneous reaction number detection circuit 280 further includes a current source 397, a switch 398, a capacitor 399, an ADC 400, a reset switch 401, and a logic circuit 402.

The comparator 391 compares a level of a voltage signal transmitted via a signal line 249-*j* with a predetermined upper threshold value ThH. The comparator 391 outputs a comparison result to a clock terminal of the latch circuit 393. The comparator 392 compares the level of the voltage signal with a lower threshold value ThL lower than the upper threshold value ThH. The comparator 392 outputs a comparison result to a clock terminal of the latch circuit 394.

The latch circuit 393 holds the high level in synchronization with a signal from the comparator 391 and outputs the high level to the inverter 395. Furthermore, a held value of the latch circuit 393 is initialized to the low level by the logic circuit 402. The latch circuit 394 holds the high level in synchronization with a signal from the comparator 392 and outputs the high level to the AND gate 396. Furthermore, a held value of the latch circuit 394 is initialized to the low level by the logic circuit 402.

The inverter 395 inverts an output of the latch circuit 393 and outputs an inverted output to the AND gate 396. The AND gate 396 outputs a logical product of an output of the inverter 395 and an output of the latch circuit 394 to the switch 398.

The current source 397 supplies a constant current. The switch 398 supplies the current from the current source 397 to the capacitor 399 in a case where the logical product of the AND gate 396 is at the high level. On the other hand, in a case where the logical product of the AND gate 396 is at the low level, the switch 398 switches an output destination of the current to a ground terminal.

The reset switch 401 initializes an amount of charge of the capacitor 399 in accordance with control of the logic circuit 402.

The ADC 400 converts a potential at a connection point between the switch 398 and the capacitor 399 into a digital signal and outputs the digital signal to the logic circuit 402. The potential is a value depending on a time during which the voltage signal changes from one of the upper threshold value ThH and the lower threshold value ThL to the other.

The logic circuit 402 obtains a slew rate on the basis of the digital signal from the ADC 400. As described above, the digital signal (potential) of the ADC 400 indicates the time during which the voltage signal changes from one of the upper threshold value ThH and the lower threshold value ThL to the other. Thus, the logic circuit 402 can obtain a speed (that is, a slew rate) at which the level of the voltage signal changes, by dividing a difference between the upper threshold value ThH and the lower threshold value ThL by the time indicated by the digital signal. Then, the logic circuit 402 detects the number of simultaneous reactions on the basis of the slew rate and outputs the number to the signal processing unit 290. For example, as the slew rate is higher, a larger number of simultaneous reactions is detected.

Furthermore, the logic circuit 402 controls the reset switch 401 at a predetermined timing after the detection of the number of simultaneous reactions to cause the capacitor 399 to be initialized, and supplies a reset signal to the latch circuits 393 and 394 to initialize the held values.

As exemplified in the figure, in a case where the number of simultaneous reactions is detected on the basis of the slew rate, it is not necessary to provide the band pass filter 371 and the peak hold circuit 372 for each frequency component. As a result, the circuit scale of the simultaneous reaction number detection circuit 280 can be reduced.

As described above, in the sixth embodiment of the present technology, since the simultaneous reaction number detection circuit 280 detects the number of simultaneous reactions on the basis of the slew rate, arrangement of the band pass filter 371 and the peak hold circuit 372 for each frequency component becomes unnecessary. As a result, the circuit scale of the simultaneous reaction number detection circuit 280 can be reduced.

7. Application Example to Mobile Body>

The technology according to the present disclosure (the present technology) can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, or the like.

Figure 36:
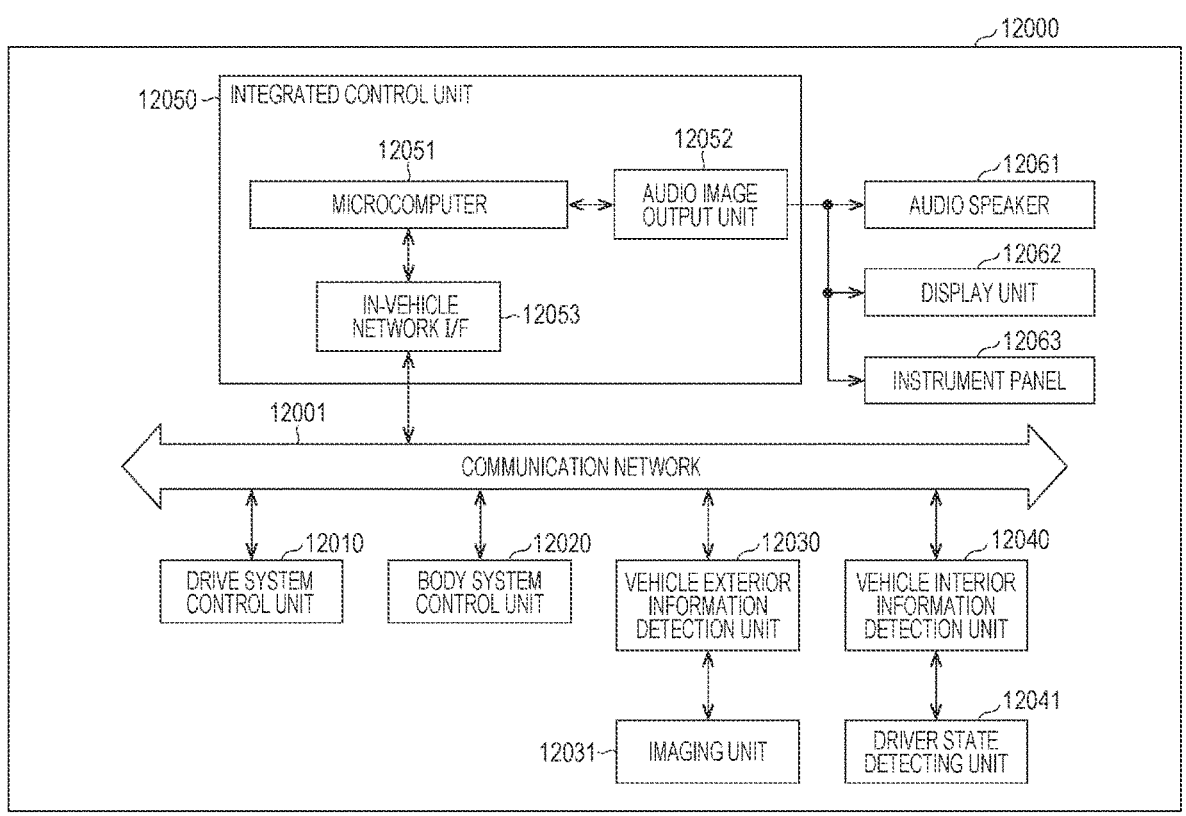
FIG. 36 is a block diagram illustrating an example of a schematic configuration of a vehicle control system.

FIG. 36 is a block diagram illustrating a schematic configuration example of a vehicle control system that is an example of a mobile body control system to which the technology according to the present disclosure can be applied.

The vehicle control system 12000 includes a plurality of electronic control units connected to each other via a communication network 12001. In the example illustrated in FIG. 36, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The imaging unit 12031 is an optical sensor that receives light and outputs an electric signal corresponding to an amount of light received. The imaging unit 12031 can output the electric signal as an image, or as distance measurement information. Furthermore, the light received by the imaging unit 12031 may be visible light, or invisible light such as infrared rays.

The vehicle interior information detection unit 12040 detects information on the inside of the vehicle. The vehicle interior information detection unit 12040 is connected to, for example, a driver state detecting unit 12041 that detects a state of a driver. The driver state detecting unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detecting unit 12041.

The microcomputer 12051 can calculate a control target value of the driving force generating device, the steering mechanism, or the braking device on the basis of the information on the inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information on the periphery of the vehicle acquired by the vehicle exterior information detection unit 12030 or the vehicle interior information detection unit 12040.

Furthermore, the microcomputer 12051 can output a control command to the body system control unit 12020 on the basis of information on the outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio or image output signal to an output device capable of visually or aurally notifying an occupant in the vehicle or the outside of the vehicle of information. In the example of FIG. 36, as the output device, an audio speaker 12061, a display unit 12062, and an instrument panel 12063 are exemplified. The display unit 12062 may include, for example, at least one of an on-board display or a head-up display.

Figure 37:
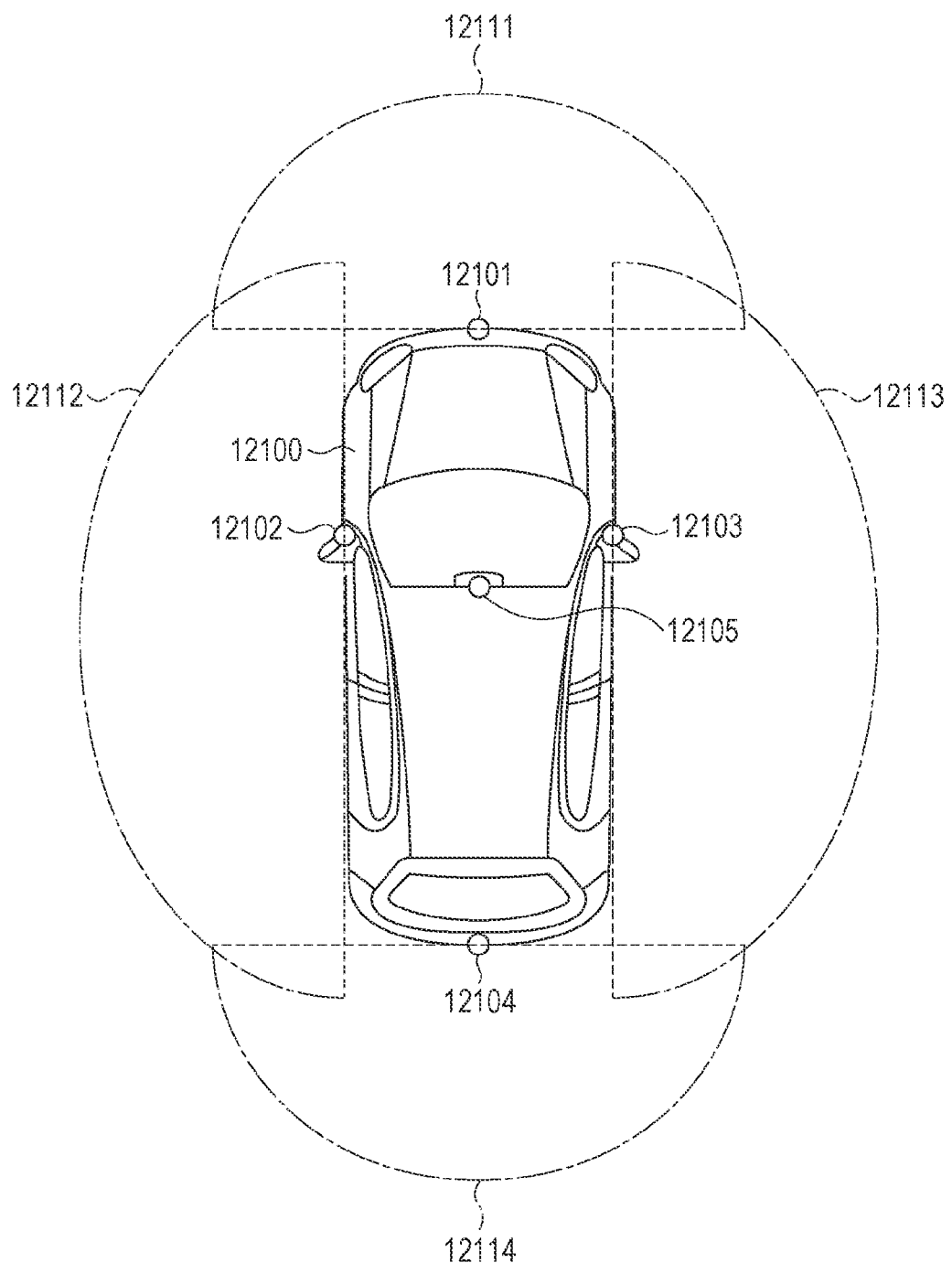
FIG. 37 is an explanatory diagram illustrating an example of installation positions of a vehicle exterior information detecting unit and an imaging unit.

FIG. 37 is a diagram illustrating an example of installation positions of the imaging unit 12031.

In FIG. 37, as the imaging unit 12031, imaging units 12101, 12102, 12103, 12104, and 12105 are included.

The imaging units 12101, 12102, 12103, 12104, and 12105 are provided, for example, at a position of the front nose, the side mirror, the rear bumper, the back door, the upper part of the windshield in the vehicle interior, or the like, of a vehicle 12100. The imaging unit 12101 provided at the front nose and the imaging unit 12105 provided at the upper part of the windshield in the vehicle interior mainly acquire images ahead of the vehicle 12100. The imaging units 12102 and 12103 provided at the side mirrors mainly acquire images on the sides of the vehicle 12100. The imaging unit 12104 provided at the rear bumper or the back door mainly acquires an image behind the vehicle 12100. The imaging unit 12105 provided on the upper part of the windshield in the vehicle interior is mainly used for detecting a preceding vehicle, a pedestrian, an obstacle, a traffic signal, a traffic sign, a lane, or the like.

Note that, FIG. 37 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, an imaging range 12114 indicates an imaging range of the imaging unit 12104 provided at the rear bumper or the back door. For example, image data captured by the imaging units 12101 to 12104 are superimposed on each other, whereby an overhead image is obtained of the vehicle 12100 viewed from above.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, on the basis of the distance information obtained from the imaging units 12101 to 12104, the microcomputer 12051 obtains a distance to each three-dimensional object within the imaging ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be ensured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the imaging units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to visually recognize. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the imaging units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the above, an example has been described of the vehicle control system to which the technology according to the present disclosure can be applied. The technology according to the present disclosure can be applied to, for example, the vehicle exterior information detection unit 12030 among the configurations described above. Specifically, the distance measurement module 100 of FIG. 1 can be applied to the vehicle exterior information detection unit 12030. By applying the technology according to the present disclosure to the vehicle exterior information detection unit 12030, miniaturization of pixels is facilitated, so that distance measurement accuracy can be improved.

Note that, the embodiments described above each describe an example for embodying the present technology, and matters in the embodiments and matters specifying the invention in the claims have correspondence relationships. Similarly, the matters specifying the invention in the claims and the matters in the embodiments of the present technology denoted by the same names have correspondence relationships. However, the present technology is not limited to the embodiments, and can be embodied by subjecting the embodiments to various modifications without departing from the gist thereof.

Note that, the advantageous effects described in the specification are merely examples, and the advantageous effects of the present technology are not limited to them and may include other effects.

Note that, the present technology can also be configured as described below.

(1) A solid-state imaging element including:

a pixel array unit provided with a plurality of pixels that generates a predetermined analog signal depending on incidence of a photon and a signal line to which the plurality of pixels is connected in common; and a photon number detection unit that detects the number of photons incident, on the basis of the analog signal transmitted via the signal line.

(2) The solid-state imaging element according to (1), in which each of the plurality of pixels supplies a current signal as the analog signal via the signal line, and the photon number detection unit includes:

a current-voltage conversion unit that converts a current signal into a voltage signal; and an analog-digital conversion unit that converts the voltage signal into the number of photons.

(3) The solid-state imaging element according to (2), in which each of the plurality of pixels includes:

a light receiving circuit that outputs a cathode potential that decreases when the photon is incident;

a second pulse signal generation unit that generates a second pulse signal depending on the cathode potential; and a transistor that outputs, to the signal line, the current signal depending on the pulse signal.

(4) The solid-state imaging element according to (3), in which each of the plurality of pixels further includes:

a first pulse signal generation unit that generates a first pulse signal having a pulse width shorter than a pulse width of the second pulse signal on the basis of an inverted signal obtained by inverting the cathode potential; and a mask processing unit that stops output of the current signal to the signal line over a predetermined mask period after the first pulse signal is generated, and the analog-digital conversion unit converts the voltage signal into the number of photons within the mask period.

(5) The solid-state imaging element according to (3) or (4), in which each of the plurality of pixels transmits, as the current signal, a pair of differential signals obtained by differentially amplifying the pulse signal and a signal obtained by inverting the pulse signal.

(6) The solid-state imaging element according to any of (3) to (5), in which the analog-digital conversion unit includes:

a zero current confirmation circuit that confirms whether or not the current signal is output;

a time digital converter that converts an elapsed time from a light emission timing to a drop of the cathode potential into a digital value in a case where the current signal is not output; and a simultaneous reaction number detection unit that detects the number of photons incident within the elapsed time on the basis of the digital value and the voltage signal.

(7) The solid-state imaging element according to (6), in which the simultaneous reaction number detection unit includes:

a peak hold circuit that holds a peak value of the voltage signal within the elapsed time; and a logic circuit that detects the number of photons on the basis of the peak value.

(8) The solid-state imaging element according to (6), in which the simultaneous reaction number detection unit includes:

a sample hold circuit that takes in the voltage signal at a predetermined timing within the elapsed time and holds the voltage signal as a hold value; and a logic circuit that detects the number of photons on the basis of the hold value.

(9) The solid-state imaging element according to (1), in which each of the plurality of pixels supplies a voltage signal as the analog signal via the signal line, and the photon number detection unit includes an analog-digital conversion unit that converts the voltage signal into the number of photons.

(10) The solid-state imaging element according to (9), in which the analog-digital conversion unit detects the number of photons on the basis of a frequency characteristic of the voltage signal.

(11) The solid-state imaging element according to (9), in which the analog-digital converter detects the number of photons on the basis of a slew rate of the voltage signal.

(12) The solid-state imaging element according to any of (1) to (11), in which the pixel array unit is divided into a plurality of pixel blocks, and the photon number detection unit detects the number of photons for each of the plurality of pixel blocks.

(13) An electronic device including:

a pixel array unit provided with a plurality of pixels that generates a predetermined analog signal depending on incidence of a photon and a signal line to which the plurality of pixels is connected in common;

a photon number detection unit that detects the number of photons incident, on the basis of the analog signal transmitted via the signal line; and a signal processing unit that measures a distance to a predetermined object on the basis of the number of photons.

REFERENCE SIGNS LIST

100 Distance measurement module
110 Light emitting unit
120 Control unit
200 Solid-state imaging element
201 Light receiving chip
202 Logic chip
210 Light receiving unit
220 Light receiving circuit
221, 331 Resistor
222 Photoelectric conversion element
230 Analog circuit accessory
240 Current signal generation unit
241 Circuit block
250 Current supply circuit
251, 256, 321, 341, 362, 395 Inverter
252, 353 Monostable multivibrator
253 Transistor
254, 255 Differential transistor
257 Current source
260 Current-voltage conversion unit
270 Analog-digital conversion unit
271 Zero current confirmation circuit
272 Time digital converter
280 Simultaneous reaction number detection circuit
281, 372 Peak hold circuit
282, 332, 344, 361 nMOS transistor
283, 312, 399 Capacitor
284, 401 Reset switch
285, 373, 400 ADC
286, 380, 402 Logic circuit
290 Signal processing unit
300 Pixel array unit
301 Pixel block
305 Pixel
306 Photon number detection unit
310 Sample hold circuit
311 Sample switch
320 Pulse shaping unit
322, 333, 343, 396 AND (logical product) gate
330 Mask processing unit
334, 335, 337, 398 Switch
336, 342 NOR (negative OR) gate
340 Voltage control circuit
350 Recharging control unit
351 OR (logical sum) gate
352 Delay circuit
370 Frequency component extraction circuit
371 Band pass filter
391, 392 Comparator
393, 394 Latch circuit
397 Current source
12030 Vehicle exterior information detection unit

The invention claimed is:

1. A solid-state imaging element, comprising:
a pixel array unit that includes:
a plurality of pixels configured to generate an analog signal based on incidence of photons; and
a signal line, wherein
the plurality of pixels is connected in common to the signal line, and
each pixel of the plurality of pixels is further configured to supply, via the signal line, a voltage signal as the analog signal; and
a photon number detection unit that includes an analog-digital conversion unit, wherein the analog-digital conversion unit is configured to detect a number of the photons based on a slew rate of the voltage signal.

2. The solid-state imaging element according to claim 1, wherein
each pixel of the plurality of pixels is configured to supply, via the signal line, a current signal as the analog signal, and
the photon number detection unit further includes
a current-voltage conversion unit configured to convert the current signal into the voltage signal.

3. The solid-state imaging element according to claim 2, wherein each pixel of the plurality of pixels includes:
a light receiving circuit configured to output a cathode potential, wherein the cathode potential decreases based on the incidence of the photons;
a second pulse signal generation unit configured to generate a second pulse signal based on the cathode potential; and
a transistor configured to output, to the signal line, the current signal based on the second pulse signal.

4. The solid-state imaging element according to claim 3, wherein
each pixel of the plurality of pixels further includes:
a first pulse signal generation unit configured to generate a first pulse signal with a first pulse width shorter than a second pulse width of the second pulse signal, wherein the generation of the first pulse signal is based on an inverted signal of the cathode potential; and
a mask processing unit configured to stop output of the current signal to the signal line, over a mask period, after the first pulse signal is generated, and
the analog-digital conversion unit is further configured to convert the voltage signal into the number of the photons within the mask period.

5. The solid-state imaging element according to claim 3, wherein each pixel of the plurality of pixels is configured to:
invert the second pulse signal to obtain a specific signal;
differentially amplify the second pulse signal and the specific signal to obtain a pair of differential signals; and
transmit, as the current signal, the pair of differential signals.

6. The solid-state imaging element according to claim 3, wherein the analog-digital conversion unit includes:
- a zero current confirmation circuit configured to confirm whether the current signal is output;
- a time digital converter configured to convert an elapsed time, from a light emission timing to a drop of the cathode potential, into a digital value in a case where the current signal is not output; and
- a simultaneous reaction number detection unit configured to detect, based on the digital value and the voltage signal, the number of the photons incident within the elapsed time.

7. The solid-state imaging element according to claim 6, wherein the simultaneous reaction number detection unit includes:
- a peak hold circuit configured to hold a peak value of the voltage signal within the elapsed time; and
- a logic circuit configured to detect the number of the photons based on the peak value.

8. The solid-state imaging element according to claim 6, wherein the simultaneous reaction number detection unit includes:
- a sample hold circuit configured to:
  - receive the voltage signal at a specific timing within the elapsed time; and
  - hold the received voltage signal as a hold value; and
- a logic circuit configured to detect the number of the photons based on the hold value.

9. The solid-state imaging element according to claim 1, wherein
- the analog-digital conversion unit is further configured to convert the voltage signal into the number of the photons.

10. The solid-state imaging element according to claim 9, wherein the analog-digital conversion unit is further configured to detect the number of the photons based on a frequency characteristic of the voltage signal.

11. The solid-state imaging element according to claim 1, wherein
- the pixel array unit further includes a plurality of pixel blocks, and
- the photon number detection unit is further configured to detect the number of the photons for each of the plurality of pixel blocks.

12. An electronic device, comprising:
- a pixel array unit that includes:
  - a plurality of pixels configured to generate an analog signal based on incidence of photons; and
  - a signal line, wherein
    - the plurality of pixels is connected in common to the signal line, and
    - each pixel of the plurality of pixels is further configured to supply, via the signal line, a voltage signal as the analog signal;
- a photon number detection unit that includes an analog-digital conversion unit, wherein the analog-digital conversion unit is configured to detect a number of the photons based on a slew rate of the voltage signal; and
- a signal processing unit configured to measure a distance to an object based on the number of the photons.

13. A solid-state imaging element, comprising:
- a pixel array unit that includes:
  - a signal line; and
  - a plurality of pixels configured to generate an analog signal based on incidence of photons, wherein
    - each pixel of the plurality of pixels is configured to supply, via the signal line, a current signal as the analog signal, and
    - the plurality of pixels is connected in common to the signal line; and
- a photon number detection unit that includes:
  - a current-voltage conversion unit configured to convert the current signal into a voltage signal; and
  - an analog-digital conversion unit configured to convert the voltage signal into a number of the photons,
  - wherein each pixel of the plurality of pixels includes:
    - a light receiving circuit configured to output a cathode potential, wherein the cathode potential decreases based on the incidence of the photons;
    - a second pulse signal generation unit configured to generate a second pulse signal based on the cathode potential; and
    - a transistor configured to output, to the signal line, the current signal based on the second pulse signal.

* * * * *